US012689214B2

(12) United States Patent　　　　(10) Patent No.: US 12,689,214 B2
　Itaya et al.　　　　　　　　　　　　(45) Date of Patent:　Jul. 21, 2026

(54) LOAD CONTROL DEVICE, CENTRAL DEVICE, LOAD CONTROL SYSTEM, LOAD CONTROL METHOD, AND STORAGE MEDIUM

(71) Applicant: Mitsubishi Electric Corporation, Tokyo (JP)

(72) Inventors: Nobuhiko Itaya, Tokyo (JP); Shunsuke Kawano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 333 days.

(21) Appl. No.: 18/693,039

(22) PCT Filed: Sep. 27, 2021

(86) PCT No.: PCT/JP2021/035319

§ 371 (c)(1),
(2) Date: Mar. 18, 2024

(87) PCT Pub. No.: WO2023/047569

PCT Pub. Date: Mar. 30, 2023

(65) Prior Publication Data

US 2024/0388088 A1　　Nov. 21, 2024

(51) Int. Cl.
*H02J 3/001*　　　(2026.01)
*H02J 13/12*　　　(2026.01)

(52) U.S. Cl.
CPC .............. *H02J 3/001* (2020.01); *H02J 13/12* (2026.01)

(58) Field of Classification Search
None
See application file for complete search history.

(56) References Cited

U.S. PATENT DOCUMENTS 9,660,458 B2 * 5/2017 Adelberger .............. H02J 3/38
2014/0042811 A1 2/2014 Myamoto et al.

FOREIGN PATENT DOCUMENTS

JP　　2012228043 A　　11/2012
JP　　2013221759 A　　10/2013
JP　　2017229125 A　　12/2017

OTHER PUBLICATIONS

International Search Report (PCT/ISA/210) with English translation and Written Opinion (PCT/ISA/237) mailed on Dec. 7, 2021, by the Japanese Patent Office as the International Searching Authority for International Application No. PCT/JP2021/035319, 9 pages.

* cited by examiner

*Primary Examiner* — Ryan A Jarrett
(74) *Attorney, Agent, or Firm* — BUCHANAN, INGERSOLL & ROONEY PC

(57)　　　　ABSTRACT

A load control device controls a load belonging to a small-scale electrical grid capable of autonomous operation using a power storage system during a power outage in an electrical grid. The load control device includes: a voltage measurement unit that measures a voltage at a power reception point of a consumer corresponding to the load; a load control information storage unit that stores load control information indicating whether to place a load limitation on the load during the autonomous operation; a load control determination unit that determines whether the autonomous operation has been started after occurrence of a power outage in the electrical grid by using the load control information and a measurement value measured by the voltage measurement unit; and a load control unit that places a load limitation on the load in response to the load control determination unit determining that the autonomous operation has started.

16 Claims, 13 Drawing Sheets

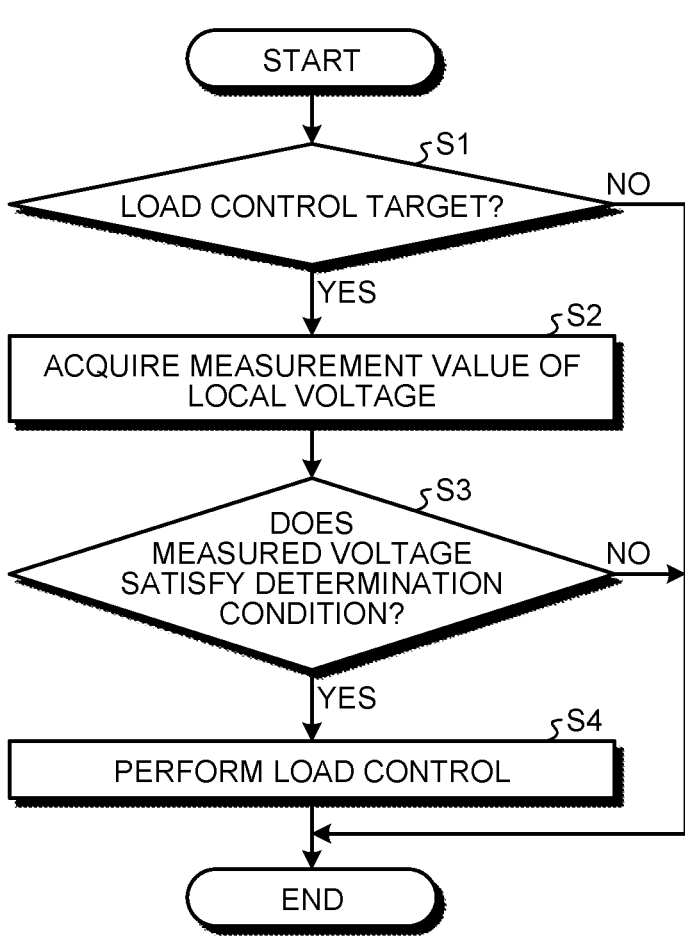

```
            START
              │
              ▼
         ╱──────────╲  ⌐S1
        ╱  LOAD      ╲        NO
       ╱   CONTROL    ╲──────────┐
        ╲  TARGET?    ╱          │
         ╲──────────╱            │
              │ YES              │
              ▼  ⌐S2             │
   ┌──────────────────────┐      │
   │ ACQUIRE MEASUREMENT   │      │
   │ VALUE OF LOCAL VOLTAGE│      │
   └──────────────────────┘      │
              │                  │
              ▼  ⌐S3             │
         ╱──────────╲            │
        ╱    DOES    ╲     NO    │
       ╱ MEASURED VOLTAGE╲───────┤
       ╲ SATISFY          ╱      │
        ╲ DETERMINATION  ╱       │
         ╲ CONDITION?   ╱        │
          ╲──────────╱           │
              │ YES              │
              ▼  ⌐S4             │
   ┌──────────────────────┐      │
   │  PERFORM LOAD CONTROL │      │
   └──────────────────────┘      │
              │◄─────────────────┘
              ▼
            END
```

FIG.8

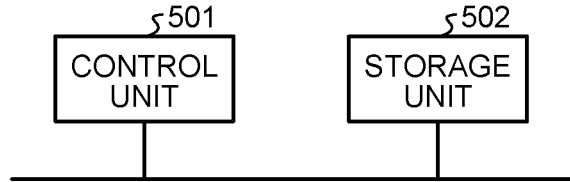

```
      ⌐501              ⌐502
  ┌──────────┐      ┌──────────┐
  │ CONTROL  │      │ STORAGE  │
  │  UNIT    │      │  UNIT    │
  └────┬─────┘      └────┬─────┘
       │                 │
  ─────┴─────────────────┴──────
```

| CONSUMER | CONTRACT |
| --- | --- |
| CONSUMER 4a-1 | PREFERENTIAL CONTRACT |
| CONSUMER 4a-2 | NO PREFERENTIAL CONTRACT |
| CONSUMER 4a-3 | - |
| CONSUMER 4a-4 | NO PREFERENTIAL CONTRACT |
| CONSUMER 4a-5 | NO PREFERENTIAL CONTRACT |
| ⋮ | |

| CONSUMER | PRIORITY |
|---|---|
| CONSUMER 4a-1 | $L_1$ |
| CONSUMER 4a-2 | $L_3$ |
| CONSUMER 4a-3 | - |
| CONSUMER 4a-4 | $L_2$ |
| CONSUMER 4a-5 | $L_3$ |
| ⋮ | |

START

↓

DETERMINE PARAMETER TO BE GIVEN
TO LOAD CONTROL DEVICE    S21

↓

GIVE PARAMETER TO
LOAD CONTROL DEVICE    S22

↓

END

START

↓

HAS PARAMETER
BEEN RECEIVED?    S31    NO

YES

↓

UPDATE STORED PARAMETER    S32

↓

END

| DEGREE OF LOAD LIMITATION | STARTUP PARAMETER OF POWER STORAGE SYSTEM | PRIORITY OF LOAD TO BE OPERATED |
|---|---|---|
| $C_1$ | $A_1$, $B_1$ | $L_1$ |
| $C_2$ | $A_2$, $B_2$ | $L_1$, $L_2$ (WITH LIMIT) |
| $C_3$ | $A_3$, $B_3$ | $L_1$, $L_2$ (WITH NO LIMIT) |
| ⋮ | | |

LOAD CONTROL DEVICE, CENTRAL DEVICE, LOAD CONTROL SYSTEM, LOAD CONTROL METHOD, AND STORAGE MEDIUM

FIELD

The present disclosure relates to a load control device, a central device, a load control system, a load control method, and a load control program for controlling a load that consumes electric power.

BACKGROUND

In times of disaster etc., power supply from an electrical grid may be stopped, that is, a power outage may occur. In recent years, there is an increasing interest in using a power source in a specific region so as to continue power supply in that region in the event of a power outage. This type of electric power network, which is capable of autonomous operation in a specific region independently of the electrical grid, is called a microgrid (small-scale electrical grid). While the external electrical grid is in a sound condition, the microgrid covers the power consumed in the microgrid, using power supplied from the electrical grid and power generated in the microgrid. Thus, a transition to autonomous operation following a power outage in the external electrical grid causes a decrease in power supply into the microgrid and a disruption in the power supply and demand balance.

Patent Literature 1 discloses a microgrid that transitions to autonomous operation when the supply of power from the external electrical grid is stopped. With the technique described in Patent Literature 1, in response to a determination, on the basis of weather information etc., that the probability of occurrence of a power outage is high, at least some of the load facilities are stopped using prediction values of demand by the load facilities and power generation in the microgrid such that the supply and demand balance falls within the allowable range after the autonomous operation. As a result, with the technique described in Patent Literature 1, the supply and demand balance in the microgrid falls within the allowable range even after a power outage occurs.

CITATION LIST

Patent Literature

Patent Literature 1: Japanese Patent Application Laid-open No. 2017-229125

SUMMARY OF INVENTION

Problem to be Solved by the Invention

After a power outage occurs in an electrical grid, power may be supplied from the external electrical grid recovering from the power outage in a short time. Alternatively, such power outage may continue for a long time. If the power outage lasts for a long time, it is necessary to transition to autonomous operation to perform load control. In the case of a quick recovery from the power outage, however, it is not necessary to transition to autonomous operation, nor is it necessary to perform load control. With the technique described in Patent Literature 1, load control is performed by predicting the occurrence of a power outage in advance; therefore, the power outage may not actually occur, in which case unnecessary load control is performed. In addition, with the technique described in Patent Literature 1, unnecessary load control is also performed in the case of a quick recovery from a power outage after the occurrence of the power outage. It is therefore desired to place a load limitation when transitioning to autonomous operation as well as to prevent unnecessary load limitation after a power outage occurs.

The present disclosure has been made in view of the above, and an object thereof is to provide a load control device capable of placing a load limitation when transitioning to autonomous operation as well as to prevent unnecessary load limitation after a power outage occurs.

Means to Solve the Problem

To solve the above problem and achieve the object, a load control device according to the present disclosure is a load control device to control a load belonging to a small-scale electrical grid capable of autonomous operation using a power storage system during a power outage in an electrical grid, the load control device comprising: a voltage measurement unit to measure a voltage at a power reception point of a consumer corresponding to the load; and a limitation information storage unit to store limitation information indicating whether to place a load limitation on the load during the autonomous operation. The load control device further comprises a load control determination unit to determine whether the autonomous operation has started after occurrence of a power outage in the electrical grid, by using the limitation information stored in the limitation information storage unit and a measurement value measured by the voltage measurement unit; and a load control unit to place a load limitation on the load in response to the load control determination unit determining that the autonomous operation has started.

Effects of the Invention

The load control device according to the present disclosure can achieve the effect of placing the load limitation when transitioning to the autonomous operation as well as to prevent unnecessary load limitation after a power outage occurs.

BRIEF DESCRIPTION OF DRAWINGS

FIG. 1 is a diagram illustrating an example of an electrical grid according to the first embodiment.

FIG. 2 is a diagram illustrating an example of a microgrid according to the first embodiment.

FIG. 7 is a flowchart illustrating an exemplary procedure for the load control process in the load control device according to the first embodiment.

FIG. 8 is a diagram illustrating an exemplary configuration of a control circuit that implements the load control device according to the first embodiment.

DESCRIPTION OF EMBODIMENTS

Figure 3:
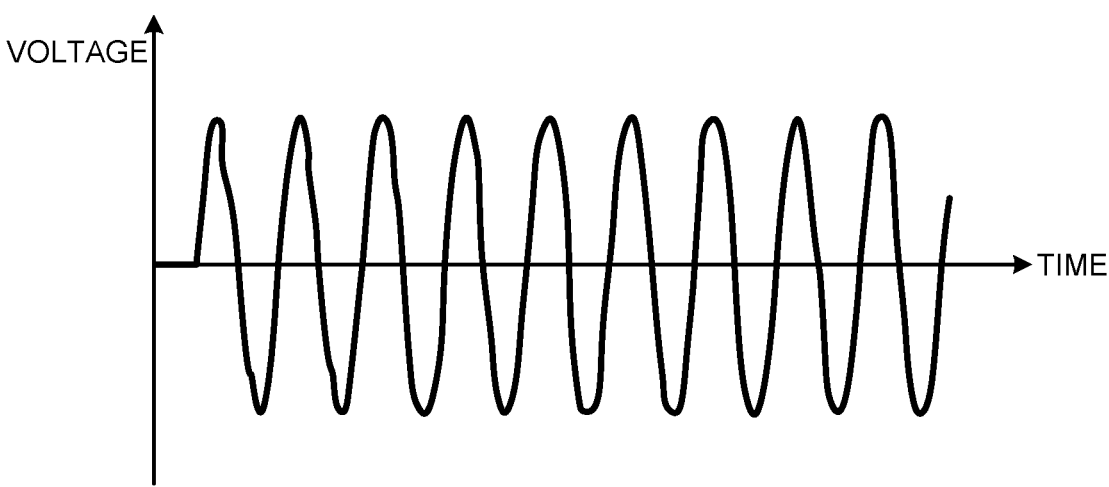
FIG. 3 is a diagram schematically illustrating a change in voltage at the power reception point of the consumer associated with the supply of grid power after a recovery from a power outage in the first embodiment.

A load control device, a central device, a load control system, a load control method, and a load control program according to embodiments will be hereinafter described in detail with reference to the drawings.

First Embodiment

Figure 1:
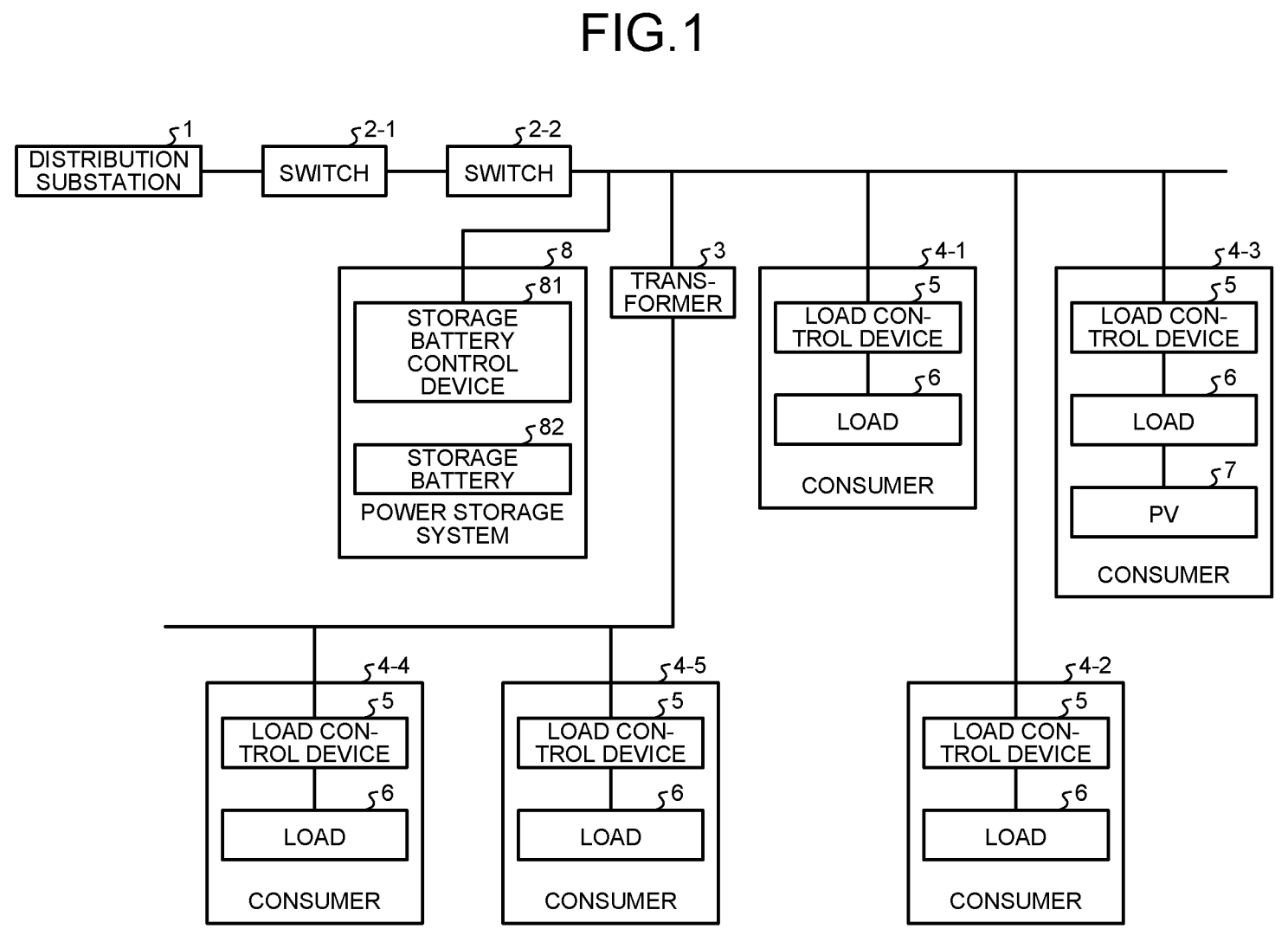

FIG. 1 is a diagram illustrating an example of an electrical grid according to the first embodiment. In the example illustrated in FIG. 1, switches 2-1 and 2-2, a power storage system 8, and a transformer 3 are connected to a high-voltage distribution line connected to a distribution substation 1. The switches 2-1 and 2-2 open and close the electric paths of the high-voltage distribution line. The switches 2-1 and 2-2 may be hereinafter collectively referred to as the switch(es) 2. The transformer 3, which is, for example, a pole-mounted transformer, converts high-voltage power into low-voltage power for output to a low-voltage distribution line. The transformer 3 need not necessarily be a pole-mounted transformer, but may be any transformer that converts high-voltage power into low-voltage power, and may be installed on the ground or the like. The voltage of the high-voltage distribution line is, for example, 6600 V, and the voltage of the low-voltage distribution line is generally 100 to 200 V, but specific voltage values are not limited to this example.

The high-voltage distribution line is connected to a load facility (hereinafter abbreviated as load) 6 that consumes electric power, and a power generation facility such as a photovoltaic generation facility (hereinafter abbreviated as PV) 7. Specifically, the high-voltage distribution line is connected to the load 6 of a consumer 4-1 and a load control device 5 connected to that load 6. The load control device 5 is capable of controlling the load 6. The high-voltage distribution line is also connected to the load 6 of a consumer 4-2 and the load control device 5 connected to that load 6 and capable of controlling the load 6. The high-voltage distribution line is also connected to the load 6 and the PV 7 of a consumer 4-3 and the load control device 5 connected to that load 6 and the PV 7 and capable of controlling the load 6. The consumers 4-1 to 4-3 are high-voltage consumers that receive power supply from the high-voltage distribution line.

The low-voltage distribution line connected to the transformer 3 is connected to each facility of consumers 4-4 and 4-5. Specifically, the low-voltage distribution line is connected to the load 6 of the consumer 4-4 and the load control device 5 connected to that load 6 and capable of controlling the load 6. The low-voltage distribution line is also connected to the load 6 of the consumer 4-5 and the load control device 5 connected to that load 6 and capable of controlling the load 6. The consumers 4-4 and 4-5 are low-voltage consumers that receive power supply from the low-voltage distribution line.

The load control device 5 is, for example, a metering device called a smart meter for automatic meter reading of electric power, but the load control device 5 may be provided separately from the metering device. In cases where the load control device 5 is a smart meter, a newly installed smart meter may have the function as the load control device 5 according to the present embodiment, or software may be installed on an existing smart meter so that the smart meter can function as the load control device 5 according to the present embodiment.

When there is no power outage, that is, when power supplied from the distribution substation 1 is supplied to the high-voltage distribution line, grid power, which is electric power supplied from the distribution substation 1, is supplied to the loads 6 of the consumers 4-1 to 4-5. The consumers 4-1 to 4-5 may be hereinafter collectively referred to as the consumer(s) 4. The power reversely flowing from the PV 7 and/or the power storage system 8 may be supplied to the load 6. The power storage system 8 includes a storage battery 82 and a storage battery control device 81 that controls charging and discharging of the storage battery 82. The power storage system 8 may be used, for example, for adjustment of the supply and demand balance when there is no power outage.

Figure 2:
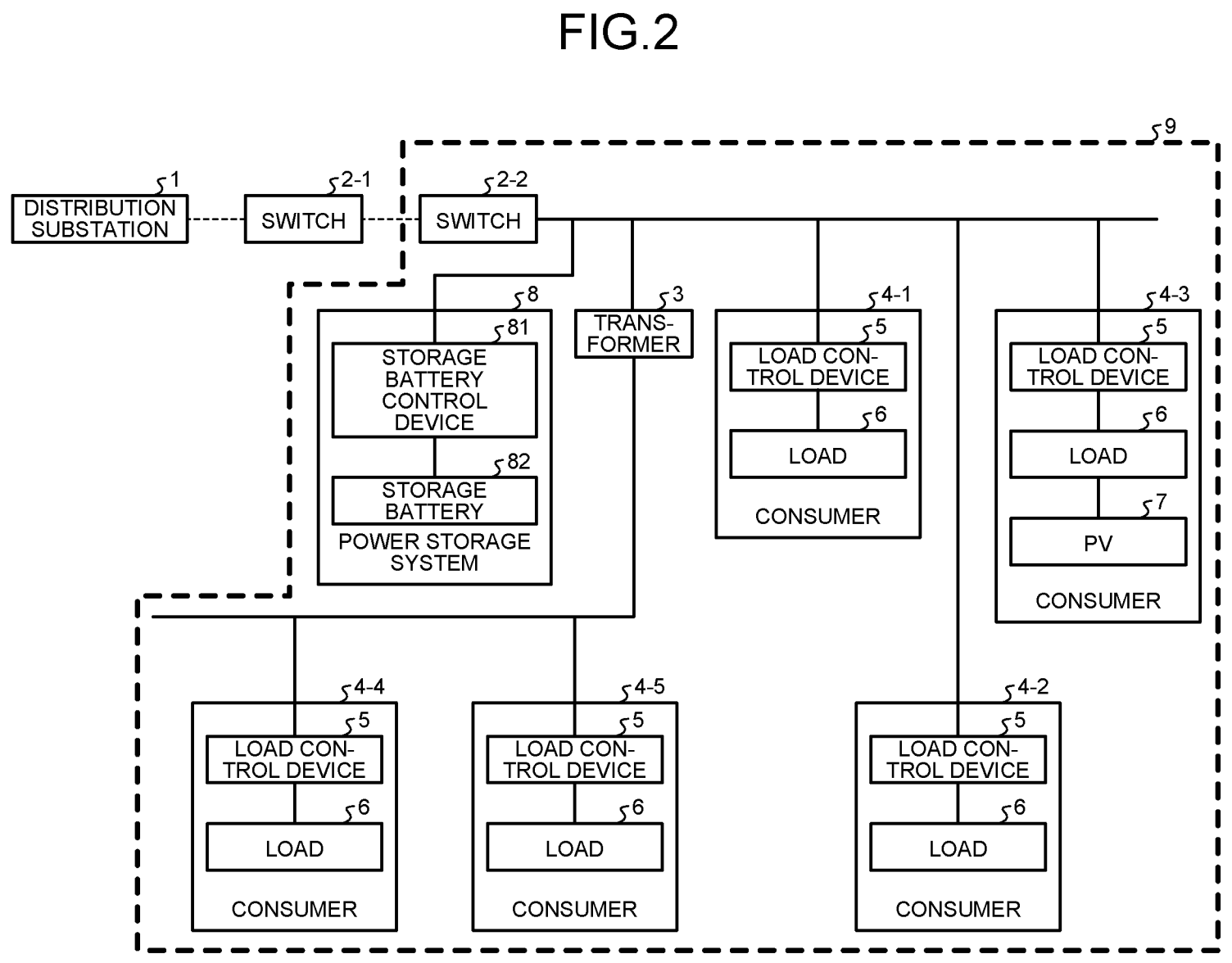

FIG. 2 is a diagram illustrating an example of a microgrid according to the present embodiment. In the present embodiment, in the event that the supply of power from the distribution substation 1 is stopped, that is, in the event of a power outage, it is possible to perform autonomous operation in the microgrid 9 with the switch 2-2 as the demarcation point. The microgrid 9 is a small-scale electrical grid. In the example illustrated in FIG. 2, each facility of the five consumers 4-1 to 4-5 is provided in the microgrid 9, but the number of consumers in the microgrid 9 is not limited to the example illustrated in FIG. 2. In the example illustrated in FIG. 2, both high-voltage consumers and low-voltage consumers are included in the microgrid 9, but high-voltage consumers or low-voltage consumers need not be included in the microgrid 9. In the example illustrated in FIGS. 1 and 2, one PV 7 is illustrated, but the number of PVs 7 is not limited thereto. In addition, some power storage system other than the power storage system & may be provided in the microgrid 9.

As illustrated in FIG. 2, each load 6 belongs to the microgrid 9 that is a small-scale electrical grid capable of autonomous operation using the power storage system 8 during a power outage in the electrical grid. The power storage system 8 may be installed by the administrator of the microgrid 9 or may be a facility in a consumer.

In FIG. 2, the microgrid 9 corresponds to the section corresponding to one switch 2-2. Alternatively, the micro-grid 9 may include facilities in the range corresponding to a plurality of switches 2. The range of the microgrid 9, that is, facilities such as the power storage system 8, the load 6, and the PV 7 of the microgrid 9, is determined in advance.

In the present embodiment, the power storage system 8 is first activated at the start (hereinafter referred to as black start) of autonomous operation after the occurrence of a power outage. In addition, for a certain period from the black start, nothing other than the power storage system 8 is used as a power source in the microgrid 9. At the black start, the applied voltage in the power storage system 8 gradually increases in order to prevent excitation inrush current through converters that perform high/low voltage conversion, such as the transformer 3 and transformers in high-voltage consumers. At the black start, therefore, the voltage at the power reception point of each consumer 4 gradually increases similarly to the applied voltage of the power storage system 8. On the other hand, when the grid power is restored recovering from a power outage after the occurrence of the power outage, the amplitude of the voltage at the power reception point of each consumer 4 is substantially constant. Note that a startup parameter indicating a change in applied voltage at the startup of the power storage system 8 is determined in advance. The applied voltage at the startup linearly increases so as to reach the rated voltage in K seconds, for example, where K is an example of the startup parameter; Note that the increase in applied voltage may not be linear.

Figure 4:
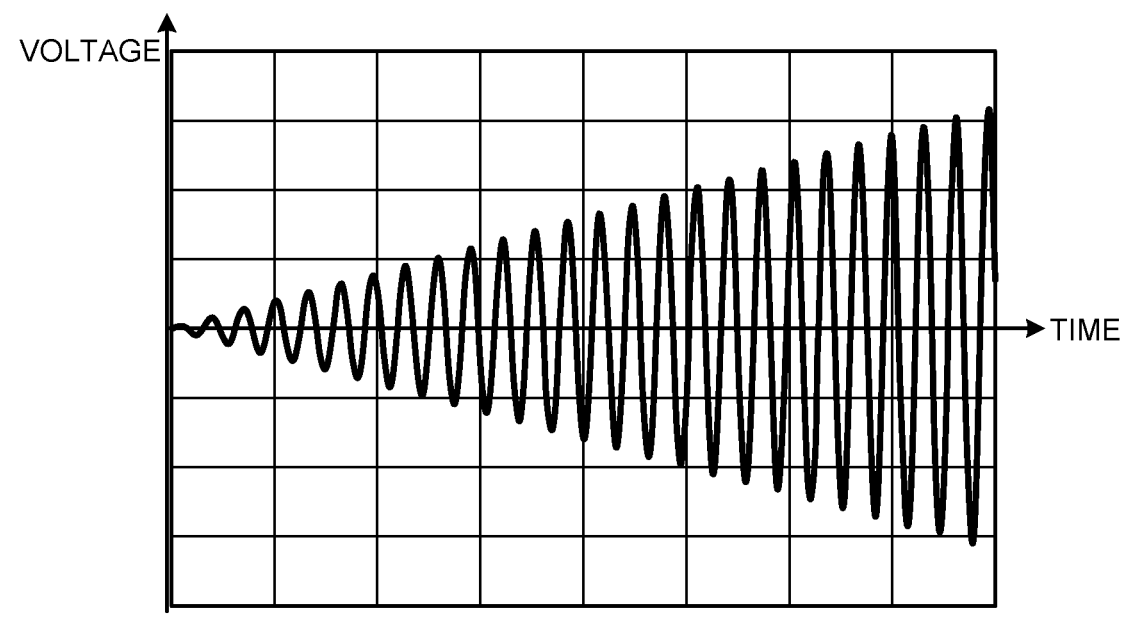
FIG. 4 is a diagram schematically illustrating a change in voltage at the power reception point of the consumer at a black start in the first embodiment.

FIG. 3 is a diagram schematically illustrating a change in voltage at the power reception point of the consumer 4 associated with the supply of grid power after a recovery from a power outage in the present embodiment; FIG. 4 is a diagram schematically illustrating a change in voltage at the power reception point of the consumer 4 at a black start in the present embodiment.

A comparison between FIG. 3 and FIG. 4 shows that the amplitude of the voltage wave is substantially constant when grid power is supplied, whereas the voltage gradually increases at the black start. In the present embodiment, each load control device 5 uses this difference to discriminate between a black start and a recovery from a power outage. Specifically, each load control device 5 measures the voltage at the local, that is, the power reception point of the consumer 4, and determines whether the measured voltage satisfies a predetermined determination condition in response to detecting a voltage of a certain value or more after a power outage occurs. An example of a certain value can be the minimum voltage required for the operation of the load control device 5. Alternatively, a certain value may be any value from which a continuous power outage can be recognized. For example, a certain value may be set by the operator. A load control start condition is a condition for determining whether a black start is in progress, and is a determination condition for starting load control when load control is required. The load control device 5 determines that & black start is in progress when the measured voltage satisfies the determination condition, and determines that grid power is being restored when the measured voltage does not satisfy the determination condition.

Each load control device 5 holds in advance load control information indicating whether to limit the power consumption of the corresponding load 6 for a certain period from a black start. Limiting the power consumption of the load 6 is also hereinafter referred to as load limitation, and limiting the power consumption of the load 6 for a certain period from a black start is also referred to as load limitation at a black start. The load limitation also includes limiting the power consumption to zero, that is, stopping the load 6. When the held load control information indicates that the load limitation at a black start is to be placed, each load control device 5 performs load control to place the load limitation on the corresponding load 6 upon determining, on the basis of the measured voltage, that a black start is in progress.

For example, the administrator of the microgrid 9 determines in advance a load limitation policy specifying to which consumer 4's load 6 the power supplied from the power storage system 8 is to be supplied in a certain period in which the microgrid @ performs autonomous operation using the power storage system 8 as a power source. On the basis of the load limitation policy, load control information corresponding to each load control device 5 is created, and the created load control information is stored in the corresponding load control device 5. For example, the administrator assumes State of Charge (SoC) as a predetermined value. The SoC is an index indicating the state of charge of the storage battery 82 of the power storage system 8. The SoC is indicated by, for example, a percentage value with the full charge being 100%. Then, the administrator selects the load & to be operated during a certain period from a black start, using a predetermined value which is the SoC of the storage battery 82, the capacity of the storage battery 82, the power consumption of the load & of each consumer 4, the connection position of each load 6 in the electrical grid, and the priority of the consumer 4. The power consumption of the load 6 of each consumer 4 may be the average of past records, the maximum value of past records, be calculated using contract power, or be calculated by other means. The priority of the consumer 4 may be determined by, for example, whether a contract to preferentially receive the supply of power during autonomous operation has been concluded, may be determined in advance according to the importance in times of disaster, or may be a combination thereof. Places that should serve as bases in times of disaster such as hospitals or local government facilities may be given high priority.

For example, two types of priorities may be sets high priority and low priority, in which case the consumer 4 that has a contract to preferentially receive the supply of power during autonomous operation and the consumer 4 given high importance in times of disaster may be set as the high-priority consumers 4, and the others may be set as the low-priority consumers 4. In this case, the load limitation policy may be determined such that the high-priority load 6 does not undergo a load limitation at a black start, and the load 6 of the low-priority consumer 4 is stopped for a certain period from a black start. Alternatively, three types of priorities may be set: high, medium, and low, in which case the priority of the consumer 4 that has a contract to preferentially receive the supply of power during autonomous operation may be set to high, the priority of the consumer 4 given high importance in times of disaster may be set to middle, and the priority of the other consumers 4 may be set to low. In this case, for example, the load limitation policy may be set such that the consumer 4 with high priority does not undergo a load limitation at a black start, the consumer 4 with medium or low priority undergoes a load limitation at a black start, and the contents of load limitations differ between medium priority and low priority. For example, the consumer 4 with middle priority may undergo a load limitation at a black start in which an upper limit such as 10 A is set on the power consumption of the load 6, and the load 6 of the consumer 4 with low priority may be stopped at a black start. The above-described load limitation policy is an example, and whether to place a load limitation on the lead 6 of each consumer 4 can be determined in any manner that allows the power supply from the power storage system 8 to cover a certain period of operation. In the case of placing a load limitation, the upper limit value is also determined.

In normal times when no power outage occurs, the power storage system & controls charging and discharging of the storage battery 82 such that the SoC of the storage battery 82 does not fall below the predetermined value described above.

Figure 5:
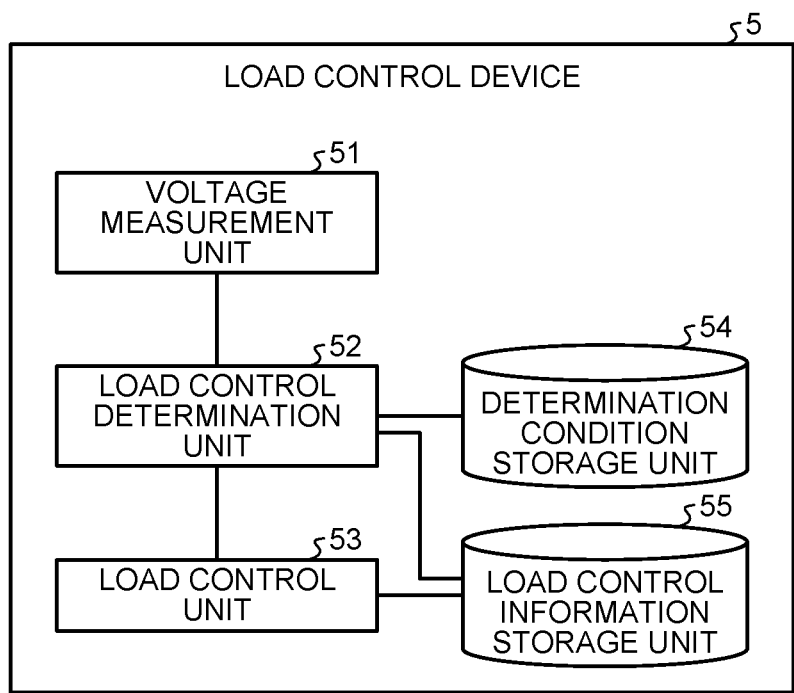
FIG. 5 is a diagram illustrating an exemplary configuration of the load control device according to the first embodiment.

FIG. 5 is a diagram illustrating an exemplary configuration of the load control device 5 according to the present embodiment. The load control device 5 includes a voltage measurement unit 51, a load control determination unit 52, a load control unit 53, a determination condition storage unit 54, and a load control information storage unit 55.

Figure 6:
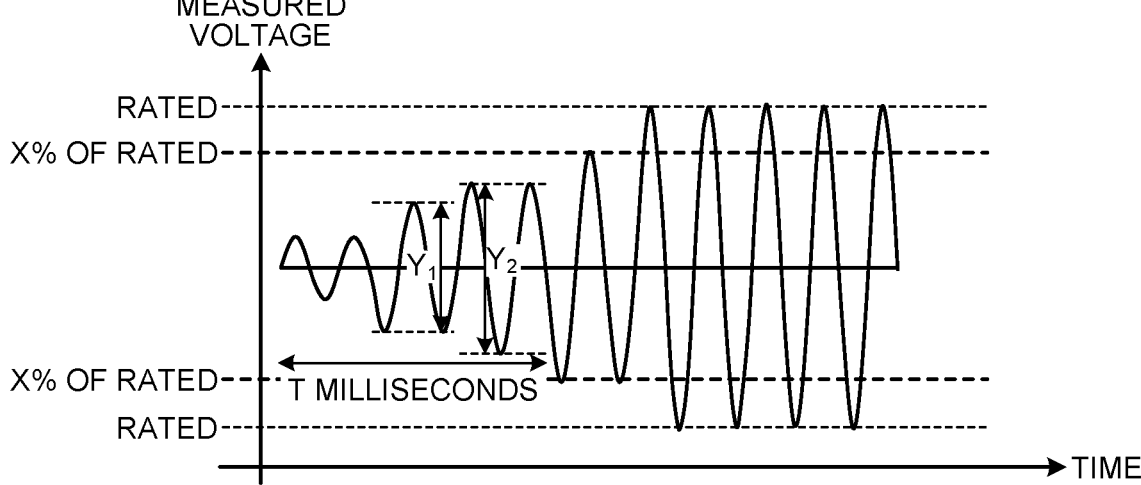
FIG. 6 is a diagram for explaining an example of a determination condition according to the first embodiment.

The determination condition storage unit 54 stores the above-described determination condition, that is, a determination condition related to the voltage at the power reception point of the consumer for determining whether a black start is in progress. FIG. 6 is a diagram for explaining an example of a determination condition according to the present embodiment. As described with reference to FIG. 4, at a black start, the amplitude of the measured voltage, which is the voltage measured by the voltage measurement unit 51, gradually increases. Therefore, for example, it is possible to get a determination condition that the value indicating the amplitude of the measured voltage keeps in the range of a certain value to X % (X<100) of the rated voltage for T milliseconds or more. The rated voltage can be, for example, the voltage (amplitude) of the grid power illustrated in FIG. 3, that is, the rated value of the grid power supplied to the connected distribution line. By setting the value of X to a value corresponding to a voltage smaller than the minimum possible value of the voltage of the grid power, it is possible to discriminate between the recovery of grid power and a black start. A value corresponding to X % of the rated voltage may be determined in advance. In this manner, the determination condition may be a condition that the time during which a value indicating the amplitude of the measured voltage is equal to or greater than a certain value and less than a predetermined value is continued for a predetermined time or more.

Alternatively, the determination condition may be a condition that $Y_2$-$Y_3$ is equal to or greater than a threshold, where $Y_1$ represents the peak-to-peak value from the positive peak to the negative peak of the measured voltage corresponding to one period, and $Y_2$ represents the peak-to-peak value in the next period. Alternatively, the determination condition may be a condition that $Z_2$-$Z_1$ is equal to or greater than a threshold, where $Z_1$ represents the effective value of the measured voltage in a certain period, and $Z_2$ represents the effective value of the measured voltage in the next period. These determination conditions are non-limiting examples. The determination condition may be determined in any manner that enables discrimination between a black start and the recovery of grid power, on the basis of the change in applied voltage at the startup of the power storage system 8. The peak-to-peak value and the effective value are examples of values indicating the amplitude of the measured voltage. In this manner, for example, the determination condition may be a condition that a value obtained by subtracting a second value from a first value is equal to or greater than a threshold, the first value indicating the amplitude of the measurement value, the second value indicating the amplitude in the period immediately preceding the period from which the first value is calculated.

The load control information storage unit 55 stores the above-described load control information. The voltage measurement unit 51 measures the local voltage, that is, the voltage at the power reception point of the consumer 4. The load control information is an example of limitation information indicating whether to place a load limitation on the load 6, and the load control information storage unit 55 is an example of a limitation information storage unit that stores the limitation information.

Using the stored limitation information and the measurement value measured by the voltage measurement unit 51, the load control determination unit 52 determines whether autonomous operation, that is, black start, has started after the occurrence of a power outage in the electrical grid. For example, when the load control information indicates that the load limitation on the load 6 is to be placed, the load control determination unit 52 determines whether autonomous operation has started, by determining whether the measurement value measured by the voltage measurement unit 51 satisfies the determination condition stored in the determination condition storage unit 54.

Specifically, the load control determination unit 52 detects the occurrence of a power outage on the basis of the voltage measured by the voltage measurement unit 51, and once the measured voltage, which is the voltage measured by the voltage measurement unit 51, becomes equal to or higher than a certain value after the occurrence of the power outage, the load control determination unit 52 refers to the load control information stored in the load control information storage unit 55 to determine whether the corresponding load 6 is a target of load limitation at a black start. As described above, the load control information is information indicating whether the corresponding load 6 is to undergo a load limitation at a black start. In other words, the load control information is information indicating whether the load control device 5 storing the load control information is a target that controls the load 6, that is, whether the load control device 5 is a load control target. When the corresponding load 6 is a target of load limitation at a black start, that is, when the load control device 5 is a load control target, the load control determination unit 52 determines whether the measured voltage from the voltage measurement unit 51 satisfies the determination condition stored in the determination condition storage unit 54. In response to determining that the determination condition is satisfied, the load control determination unit 52 instructs the load control unit 53 to perform load control.

The load control unit 53 places a load limitation on the load 6 in response to the load control determination unit 52 determining that autonomous operation, that is, black start, has started. Specifically, when instructed by the load control determination unit 52 to perform load control, the load control unit 53 places a limitation on the load 6, using the load control information stored in the load control information storage unit 55. Where the corresponding load 6 is a target of load limitation at a black start, the load control information also includes the content of the load limitation, and the load control unit 53 limits the load 6 according to the content of the load limitation. The content of the load limitation may be indicated by, for example, the upper limit value of the current corresponding to the upper limit value of the power consumption of the load 6. Alternatively, if the load limitation is only to stop the load 6, the content of the load limitation need not necessarily be stored in the load control information. In this case, the load control unit 53 stops the load 6 when the load control information indicates that the corresponding load 6 is a target of load limitation at a black start. The load 6 is stopped, for example, by opening a switch/circuit breaker incorporated in the load control device 5. In cases where the load control device 5 is a smart meter, a switch/circuit breaker of the smart meter can be used. In cases where the content of the load limitation is given as the upper limit value of the current of the load 6, the load control unit 53 limits the current, using, for example, a circuit breaker that opens when the current exceeds the upper limit value.

Next, operations according to the present embodiment will be described. FIG. 7 is a flowchart illustrating an exemplary procedure for the load control process in the load control device 5 according to the present embodiment. For example, the voltage measurement unit 51 of the load control device 5 periodically measures the local voltage, and outputs the measured voltage to the load control determination unit 52. The load control determination unit 52 detects a power outage on the basis of the measured voltage, and performs the process illustrated in FIG. 7 once the measured voltage becomes equal to or higher than a certain value after detecting the power outage.

As illustrated in FIG. 7, the load control device 5 determines whether the load control device 5 is a load control target (step S1). Specifically, the load control determination unit 52 determines whether the load control device 5 is a load control target, referring to the load control information stored in the load control information storage unit 55.

In response to determining that the load control device 5 is not a load control target (No in step S1), the load control device 5 ends the process. In response to determining that the load control device 5 is a load control target (Yes in step S1), the load control device 5 acquires a measurement value of the local voltage (step 82). Specifically, the load control determination unit 52 acquires the measured voltage from the voltage measurement unit 51.

Next, the load control device 5 determines whether the measured voltage satisfies the determination condition (step S3). Specifically, the load control determination unit 52 determines whether the measured voltage satisfies the determination condition stored in the determination condition storage unit 54. In response to determining that the measured voltage does not satisfy the determination condition (No in step S3), the load control device 5 ends the process.

In response to determining that the measured voltage satisfies the determination condition (Yes in step S3), the load control device 5 performs load control (step S4), and ends the process. Specifically, in response to determining that the measured voltage satisfies the determination condition, the load control determination unit 52 instructs the load control unit 53 to perform load control. Upon being instructed to perform load control by the load control determination unit 52, the load control unit 53 performs load control according to the content of the limitation included in the load control information, referring to the load control information stored in the load control information storage unit 55. If the load limitation is only to stop the load 6, the load control unit 53 stops the load 6 without referring to the load control information stored in the load control information storage unit 55 when instructed to perform load control by the load control determination unit 52 in step S4.

In the above example, the load control device 5 stores the determination condition and the load control information, but the determination condition may be set according to the load control information so that the determination condition can also serve as the load control information. That is, the determination condition may include the load control information. In this case, step S1 illustrated in FIG. 7 is not performed. For example, for the load control device 5 that is a load control target, the determination condition is determined in the same manner as in the above-described example, whereas for the load control device 5 that controls the load 6 that does not require load limitation, that is, the load control device 5 that is not a load control target, the determination condition is determined such that the measured voltage does not satisfy the determination condition at a black start: For example, the determination condition is determined by setting the above-described T to a very large value, setting the value of X to 100, or setting the threshold for comparison with $Y_2$-$Y_1$ to a very large value. As a result, the load control device 5 that is not a load control target does not perform load control because the load control device 5 selects No in step S3 illustrated in FIG. 7 even at an actual black start.

In cases where the determination condition also serves as the load control information, the determination condition is an example of the limitation information, and the determination condition storage unit 54 is the limitation information storage unit. In this case, the load control device 5 may not include the lead control information storage unit 55. In this case, to indicate that the load limitation on the load 6 is to be placed, the determination condition is determined on the basis of the change in applied voltage at the startup of the power storage system 8. Also, to indicate that the load limitation on the load 6 is not to be placed, the determination condition is determined such that the measurement value measured by the voltage measurement unit 51 at the start of autonomous operation does not satisfy the determination condition. Then, the load control determination unit 52 determines whether autonomous operation has started, by determining whether the measurement value measured by the voltage measurement unit 51 satisfies the determination condition stored in the determination condition storage unit 54.

In addition, after a lapse of a certain period from the black start, another power source in the microgrid 9 such as the PV 7 may be activated and a device not illustrated may control the load control device 5 so as to maintain the supply and demand balance in the microgrid 9.

Next, a hardware configuration of the load control device 5 will be described. The voltage measurement unit 51 of the load control device 5 is implemented by a voltage measuring instrument. The load control determination unit 52, the load control unit 53, the determination condition storage unit 54, and the load control information storage unit 55 of the load control device 5 are implemented by, for example, a control circuit. FIG. 8 is a diagram illustrating an exemplary configuration of a control circuit that implements the load control device 5 according to the present embodiment. The control circuit illustrated in FIG. 8 includes a control unit

501 and a storage unit 502. For example, the control unit 501 is a central processing unit (CPU) or the like executes a load control program describing the processes in the load control device 5 according to the present embodiment. The load control program is stored in the storage unit 502. The storage unit 502 includes various types of memories such as a random access memory (RAM) and a read only memory (ROM) and a storage device such as a hard disk. The storage unit 502 stores, for example, programs to be executed by the control unit 501 and necessary data obtained during processing. The storage unit 502 is also used as a temporary storage area for programs. As described above, the control circuit illustrated in FIG. 8 is one type of computer system. The load control program may be provided by a recording medium in which the load control program is recorded, or may be provided by a communication medium.

The load control program according to the present embodiment causes, for example, the load control device 5 to executes a step of acquiring a measurement value measured by the voltage measurement unit 51; a step of storing limitation information indicating whether to place a load limitation on the load 6 during the autonomous operation; a step of determining whether the autonomous operation has started after occurrence of a power outage in the electrical grid, by using the limitation information stored and the measurement value measured by the voltage measurement unit 51; and a step of placing a load limitation on the load 6 in response to determining that the autonomous operation has started.

At least a part of the load control device 5 may be implemented by a dedicated circuit such as a field programmable gate array (FPGA) or an application specific integrated circuit (ASIC), instead of the above-described control circuit.

In cases where the load control device 5 is a smart meter, the above-described control circuit may be a control circuit of the smart meter or may be added to an existing smart meter.

As described above, the load control device 5 according to the present embodiment holds the load control information indicating whether the load control device 5 is a load control target. When the load control device 5 determines on the basis of the load control information that the load control device 5 is a load control target, the load control device 5 determines whether a black start is in progress, using the measured voltage at the power reception point of the consumer 4 once the measured voltage at the power reception point of the consumer 4 becomes equal to or higher than a certain value after a power outage. Then, the load control device 5 performs load control in response to determining that a black start is in progress, and does not perform load control in response to determining that a black start is not in progress, that is, in response to grid power being restored. It is therefore possible to place a load limitation when transitioning to autonomous operation as well as to prevent unnecessary lead limitation.

In addition, if the load limitation is not placed at the same time as the start of autonomous operation in the microgrid 9 with the loads 6 of all the consumers 4 connected, the power storage system & may be overcapacity and stop operating, which can result in a failure in the startup of autonomous operation. It is therefore desirable to place a load limitation almost at the same time as the start of autonomous operation. In addition, general consumers may find it psychologically unfavorable to experience another power outage shortly after temporary restoration of electrical equipment due to the absence of load limitation at the start of autonomous operation, and it is desirable that load control for the consumer 4 that should undergo a load limitation be performed promptly at substantially the same time as the start of autonomous operation. On the other hand, if each consumer 4 is instructed to undergo a load limitation simultaneously by communication at the start of autonomous operation, it may take time to start the load limitation due to congestion of communication, delay of communication, and the like. The load control device 5 according to the present embodiment can perform load control without requiring communication for starting autonomous operation after a power outage occurs, so that the load limitation can be placed promptly after the start of autonomous operation.

Second Embodiment

Figure 9:
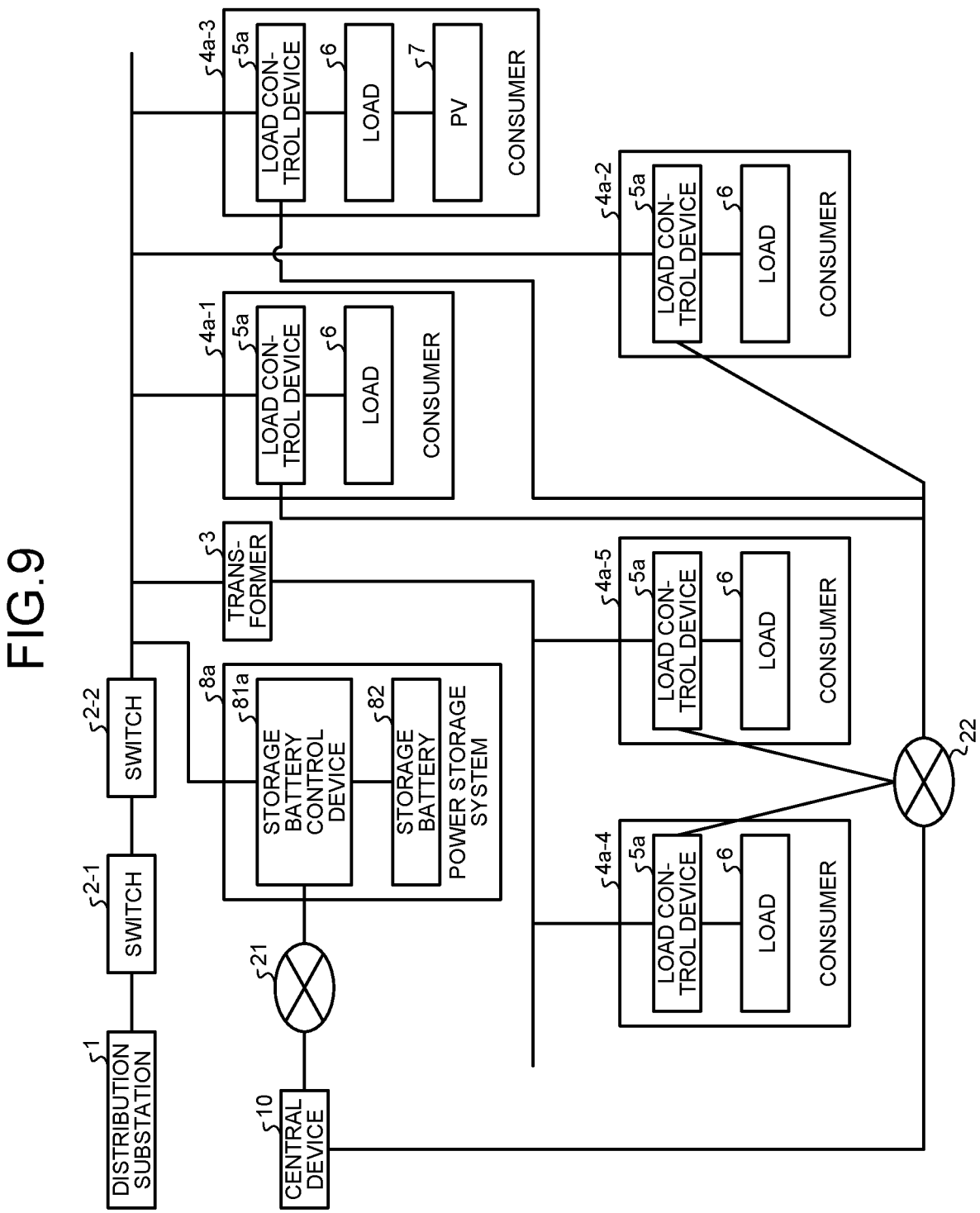
FIG. 9 is a diagram illustrating an example of a load control system according to the second embodiment.

FIG. 9 is a diagram illustrating an example of a load control system according to the second embodiment. The load control system according to the present embodiment includes a central device 10 and a load control device 5a. The load control system may further include a power storage system 8a. The electrical grid according to the present embodiment is similar to the electrical grid according to the first embodiment except that the load control device 5a is provided instead of the load control device 5 and the power storage system 8a is provided instead of the power storage system 8. The power storage system 8a includes a storage battery control device 81a and the storage battery 82, and the storage battery 82 is similar to that in the first embodiment. Consumers 4a-1 to 4a-5 are similar to the consumers 4-1 to 4-5 according to the first embodiment except that the load control device 8a is provided instead of the load control device 5 in the first embodiment. Hereinafter, the consumers 4a-1 to 4a-5 may be collectively referred to as the consumer (s) 4a. Components having the same functions as those in the first embodiment are denoted by the same reference signs as those in the first embodiment, and redundant explanations are omitted. Hereinafter, differences from first embodiment will be mainly described.

Figure 10:
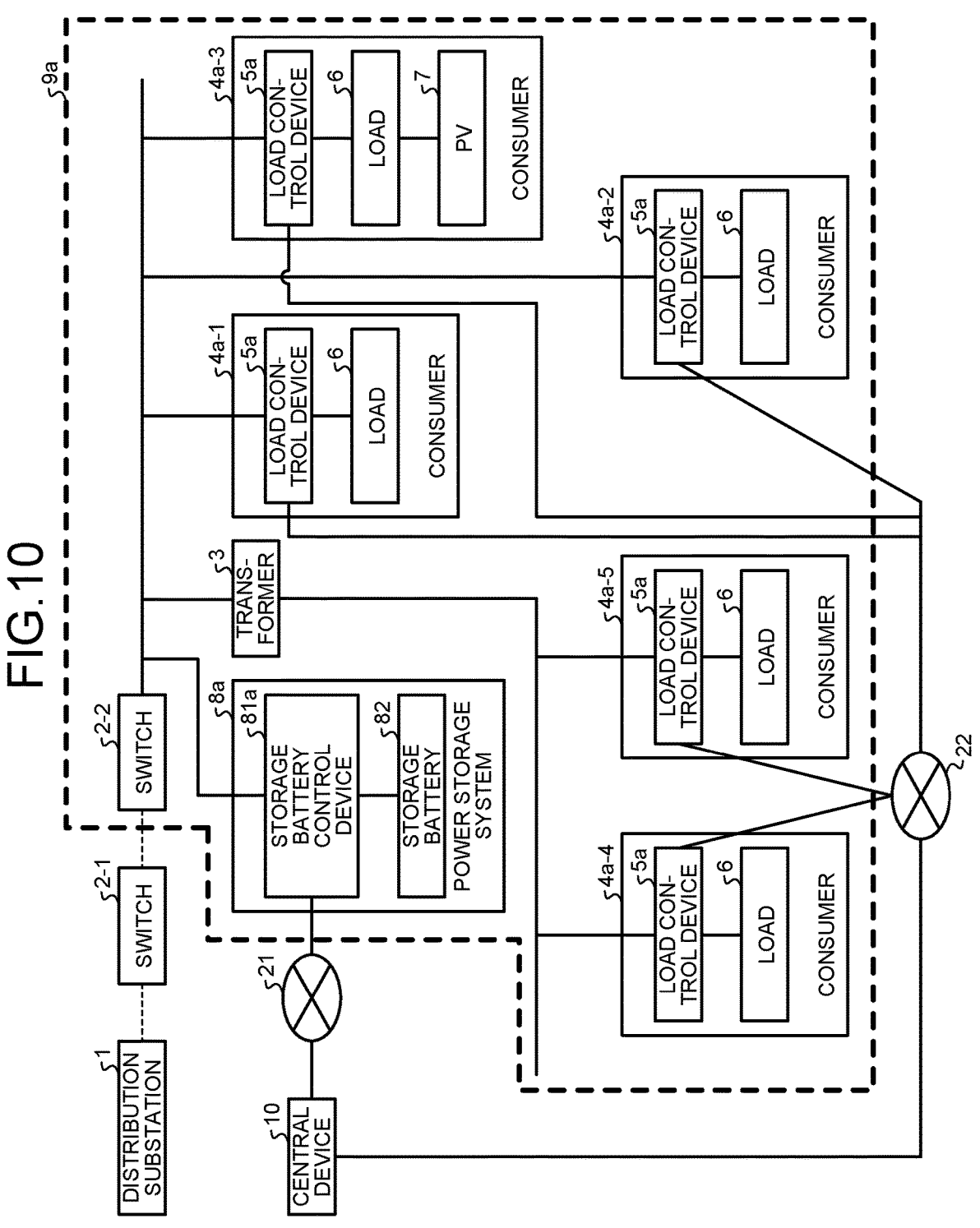
FIG. 10 is a diagram illustrating a microgrid according to the second embodiment.

FIG. 10 is a diagram illustrating a microgrid according to the present embodiment. The microgrid 9a according to the present embodiment is similar to the microgrid 9 according to the first embodiment except that the load control device 5a and the power storage system 8a are provided instead of the load control device 5 and the power storage system 8 in the first embodiment. Similarly to the microgrid 9 according to the first embodiment, the microgrid 9a according to the present embodiment can perform autonomous operation during a power outage, with the switch 2-2 get to the demarcation point.

As illustrated in FIG. 9, in the present embodiment, the load control device 5a can communicate with the central device 10 via a communication network 22. The communication network 22 may include the communication network of smart meters, or may be a communication network that does not include the communication network of smart meters. The communication network of smart meters may be, for example, a wireless multi-hop communication network, a communication network using a mobile phone network, a power line communication (PLC) communication network, or any other communication network.

In addition, the power storage system &a can communicate with the central device 10 via a communication network 21. The communication network 21 may be the same as or different from the communication network 22. The power storage system 8a periodically transmits SoC information indicating the SoC to the central device 10.

The first embodiment identifies a load control target, using the load control information and the determination condition held in advance in each load control device 5, determines whether a black start is in progress, using the measured voltage, and then places a load limitation on that load control target. In the present embodiment, in normal times when no power outage occurs, the central device 10 generates the load control information corresponding to each load control device 5a, using the SoC received from the power storage system 8a and consumer information, and transmits the generated load control information to the corresponding load control device 5a. The consumer information, which is information related to each consumer 4a, is information for determining the priority of the consumer 4a. For example, the central device 10 periodically generates and transmits that load control information. The description is made herein taking an example in which the central device 10 periodically transmits the load control information, but the central device 10 may also re-determine the determination condition when the parameter indicating a change in applied voltage at the startup in the power storage system 8a is changed, and transmit the re-determined determination condition to the load control device 5a. As described in the first embodiment, in cases where the determination condition also serves as the load control information, the load control information may be periodically generated in normal times when no power outage occurs by using the SoC received from the power storage system 8a and the consumer information, the determination condition that also serves as the load control information may be generated using the generated load control information, and the generated determination condition may be transmitted to the corresponding load control device 5a.

Figure 11:
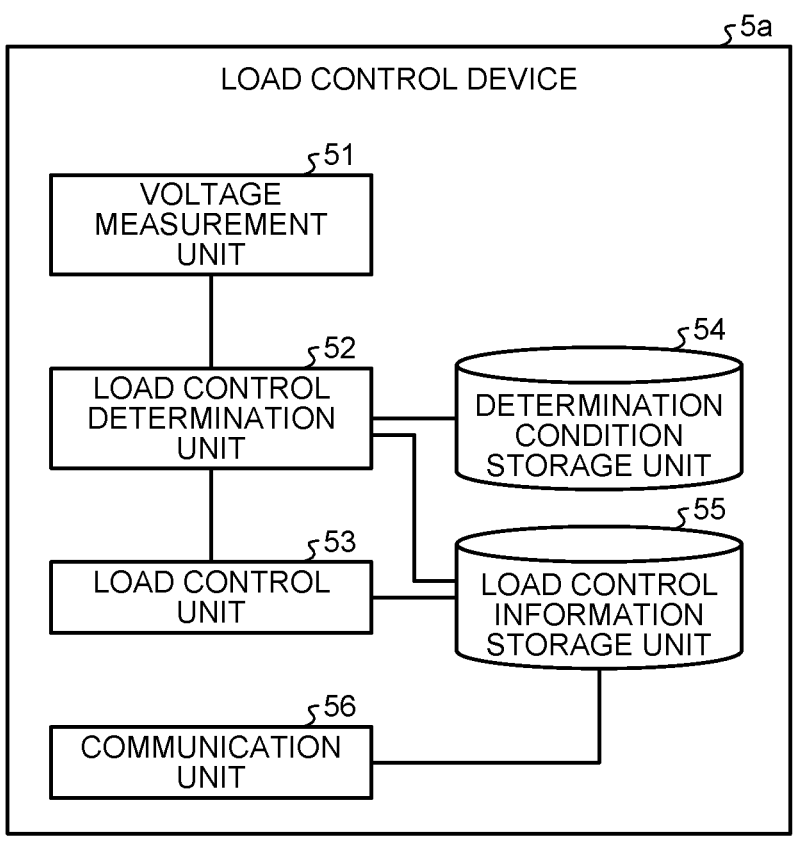
FIG. 11 is a diagram illustrating an exemplary configuration of the load control device according to the second embodiment.

FIG. 11 is a diagram illustrating an exemplary configuration of the load control device 5a according to the present embodiment. The load control device Sa according to the present embodiment is similar to the load control device 5 according to the first embodiment except that the load control device 5a has a communication unit 56 added thereto. The communication unit 56 communicates with the central device 10. Specifically, the communication unit 56 receives load control information from the central device 10, and updates the load control information by overwriting the load control information stored in the load control information storage unit 55 with the received load control information. That is, the communication unit 56 receives load control information from the central device 10, and updates the load control information stored in the load control information storage unit 55, with the received load control information. Although not illustrated in FIG. 11, in cases where the central device 10 transmits the determination condition to the load control device 5a, the communication unit 56 receives the determination condition from the central device 10, and updates the determination condition by overwriting the determination condition stored in the determination condition storage unit 54, with the received determination condition. Using the load control information updated when there is no power outage in the electrical grid, the load control determination unit 52 determines whether to place a load limitation on the load 6. The operation of the load control device 5a after detection of a power outage is similar to the operation of the load control device 5 in the first embodiment. Also in the present embodiment, the load control information and the determination condition that also serves as the load control information are examples of the limitation information, and the above-described operation corresponds to the load control device 5a receiving and storing the limitation information and updating the stored limitation information, with the newly received limitation information upon newly receiving the limitation information.

Figure 12:
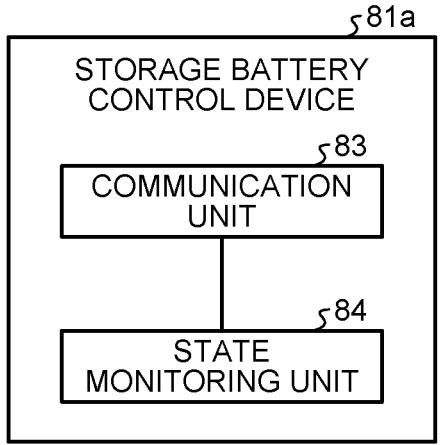
FIG. 12 is a diagram illustrating an exemplary configuration of the storage battery control device according to the second embodiment.

FIG. 12 is a diagram illustrating an exemplary configuration of the storage battery control device 81a according to the present embodiment. The storage battery control device 81a includes a communication unit 83 and a state monitoring unit 84. The state monitoring unit 84 controls charging and discharging of the storage battery 82, and acquires SoC information indicating the SoC of the storage battery 82. The state monitoring unit 84 outputs the acquired SoC information to the communication unit 83. The communication unit 83 periodically transmits SoC information to the central device 10, for example.

Figures 13, 14:
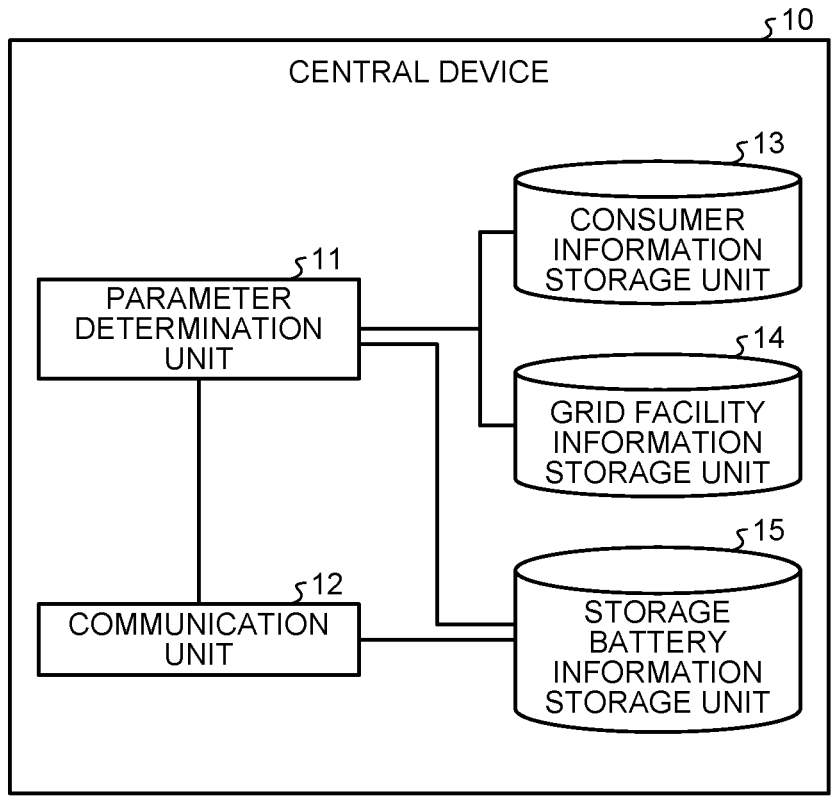
FIG. 13 is a diagram illustrating an exemplary configuration of the central device according to the second embodiment.
FIG. 14 is a diagram illustrating an example of consumer information according to the second embodiment.

FIG. 13 is a diagram illustrating an exemplary configuration of the central device 10 according to the present embodiment. As illustrated in FIG. 13, the central device 10 according to the present embodiment includes a parameter determination unit 11, a communication unit 12, a consumer information storage unit 13, a grid facility information storage unit 14, and a storage battery information storage unit 15.

The communication unit 12 receives SoC information from the storage battery control device 81a, and outputs the received SoC information to the parameter determination unit 11. The communication unit 12 also receives load control information from the parameter determination unit 11, and transmits the load control information to the corresponding load control device 5a.

Figures 15, 16:
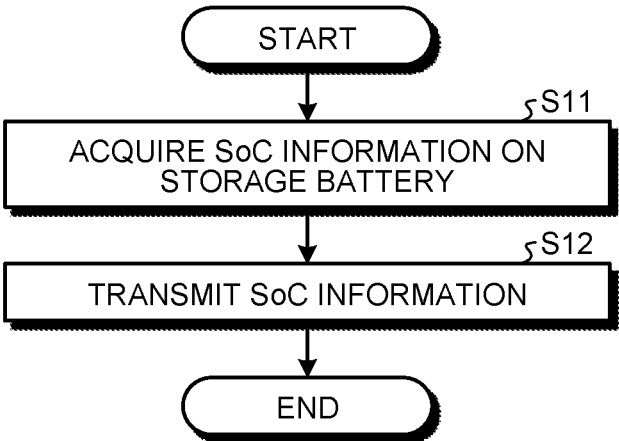
FIG. 15 is a diagram illustrating another example of consumer information according to the second embodiment.
FIG. 16 is a flowchart illustrating an example of operation in the storage battery control device according to the second embodiment.

The consumer information storage unit 13 stores consumer information. As described above, the consumer information, which is information for determining the priority of the consumer 4a, is, for example, information indicating whether each consumer 4a has a preferential contract, i.e. a contract to preferentially receive the supply of power during autonomous operation. FIG. 14 is a diagram illustrating an example of consumer information according to the present embodiment. In the example illustrated in FIG. 14, the consumer information is information indicating the presence or absence of a preferential contract. When the consumer information illustrated in FIG. 14 is used, the consumer da with a preferential contract has high priority, and the consumer 4a without a preferential contract has low priority. FIG. 15 is a diagram illustrating another example of consumer information according to the present embodiment. In the example illustrated in FIG. 15, the consumer information includes the priority of each consumer 4a. The priority may be determined on the basis of the importance in times of disaster, may be determined taking into consideration both the presence or absence of the above-described preferential contract and the importance in times of disaster, or may be determined taking into consideration other factors.

The grid facility information storage unit 14 stores grid facility information indicating the connection position of each facility such as the load 6 in the electrical grid. The grid facility information also includes the power consumption of each load 6. As in the first embodiment, the power consumption of the load 6 is calculated, for example, from past records.

The storage battery information storage unit 15 stores the rated capacity of the power storage system 8a, the startup parameter indicating the applied voltage at startup, and the like.

The parameter determination unit 11 determines the priority of each consumer 4a, using the consumer information stored in the consumer information storage unit 13 in normal times. In addition, in normal times, the parameter determination unit 11 uses the determined priority, the grid facility information stored in the grid facility information storage unit 14, and the SoC information received from the communication unit 12 to thereby determine the load control information corresponding to each load control device 5a such that the power consumption in the microgrid 9a can be covered by the power supply from the power storage system 8a for a certain period from a black start. The parameter determination unit 11 outputs the determined load control information to the communication unit 12. The method of determining the load control information is similar to that in the first embodiment except that the SoC information is used instead of a determined value as the value of the SoC. However, in the present embodiment, because the consumer information and the grid facility information are updated as appropriate, the load control information is also determined when the consumer information and the grid facility information are updated. In the first embodiment, the load control information is stored in advance in the load control device 5, but in the present embodiment, the load control information is updated in normal times. As a result, in the present embodiment, the load control information can be generated more appropriately than in the first embodiment. The SoC information acquired from the power storage system 8a is used herein as the value of the SoC, but the value of the SoC may be a determined value as in the first embodiment. Even in this case, the load control information is updated along with updates to the consumer information and the grid facility information, and thus the load control information can be generated more appropriately than in the first embodiment.

Next, operations according to the present embodiment will be described. FIG. 16 is a flowchart illustrating an example of operation in the storage battery control device 81a according to the present embodiment. For example, the storage battery control device 81a periodically performs the operation illustrated in FIG. 16. As illustrated in FIG. 16, the storage battery control device 81a acquires the SoC information on the storage battery 82 (step S11). Specifically, the state monitoring unit 84 acquires the SoC information on the storage battery 82, and outputs the SoC information to the communication unit 83.

The storage battery control device 81a transmits the SoC information (step S12), and ends the process. Specifically, in step S12, the communication unit 83 transmits the SoC information to the central device 10.

Figure 17:
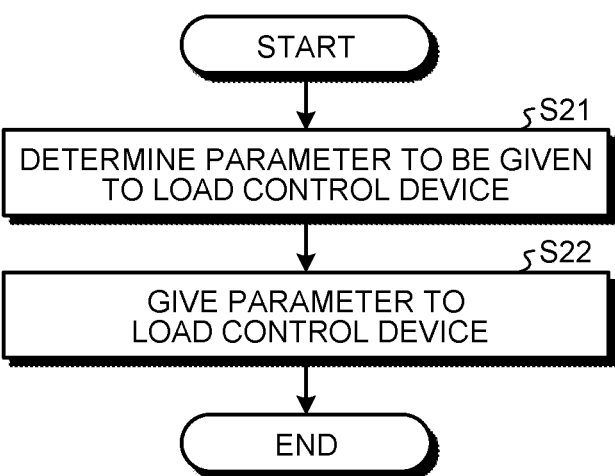
FIG. 17 is a flowchart illustrating an example of operation in the central device according to the second embodiment.

FIG. 17 is a flowchart illustrating an example of operation in the central device 10 according to the present embodiment. For example, the central device 10 performs the operation illustrated in FIG. 17 upon receiving the SoC information. The central device 10 determines a parameter to be given to the load control device (step S21). Assume herein that the parameter is load control information. Specifically, the parameter determination unit 11 determines the priority of each consumer 4a, using the consumer information stored in the consumer information storage unit 13. Then, the parameter determination unit 11 uses the determined priority, the grid facility information stored in the grid facility information storage unit 14, and the SoC information received from the communication unit 12 to thereby determine the load control information corresponding to each load control device 5a such that the power consumption in the microgrid 9a can be covered by the power supply from the power storage system 8a for a certain period from a black start. The parameter determination unit 11 outputs the determined load control information to the communication unit 12. Note that the parameter may be the determination condition that also serves as the load control information described above. In this case, the parameter determination unit 11 determines the load control information, following which the parameter determination unit 11 determines the determination condition that also serves as the load control information, using the load control information.

Next, the central device 10 gives the parameter to the load control device 5a (step S22), and ends the process. Specifically, in step S22, the communication unit 12 transmits the load control information which is the parameter to the corresponding load control device 5a.

Figure 18:
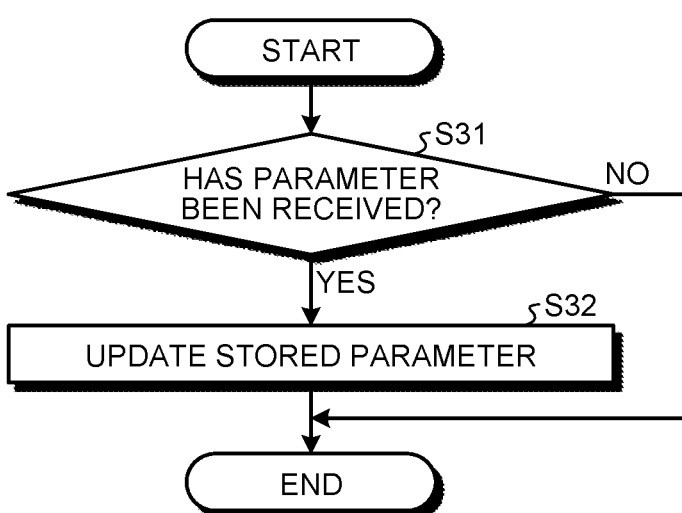
FIG. 18 is a flowchart illustrating an example of the parameter update process in normal times in the load control device according to the second embodiment.

FIG. 18 is a flowchart illustrating an example of the parameter update process in normal times in the load control device 5a according to the present embodiment. The load control device 5a determines whether a parameter has been received (step S31). Specifically, the communication unit 56 determines whether a parameter has been received. In response to determining that a parameter has not been received (No in step S31), the load control device 5a ends the process.

In response to determining that a parameter has been received (Yes in step S31), the load control device 5a updates the stored parameter (step 32), and ends the process. Specifically, in step S32, when the parameter is load control information, the communication unit 56 receiving the load control information updates the stored load control information by overwriting the load control information stored in the load control information storage unit 55, with the received load control information. When the parameter is the determination condition that also serves as the load control information, the communication unit 56 receiving the determination condition updates the stored determination condition by updating the determination condition stored in the determination condition storage unit 54, with the received determination condition.

The above parameter update process in the load control device 5a is performed in normal times. The operation of the load control device 5a after occurrence of a power outage is similar to that of the load control device 5 in the first embodiment. After a power outage occurs, therefore, the load control device 5a does not need to communicate with the central device 10: when the load control device 5a determines that the load control device 5a is a load control target, using the stored load control information, the load control device 5a determines whether a black start is in progress, using the measured voltage at the power reception point of the consumer 4a and the stored determination condition once the measured voltage at the power reception point of the consumer da becomes equal to or higher than a certain value after the power outage. Then, the load control device 5a performs load control upon determining that a black start is in progress. As a result, when autonomous operation starts in the microgrid 9a after a power outage occurs, load control can be performed without requiring communication.

Figure 19:
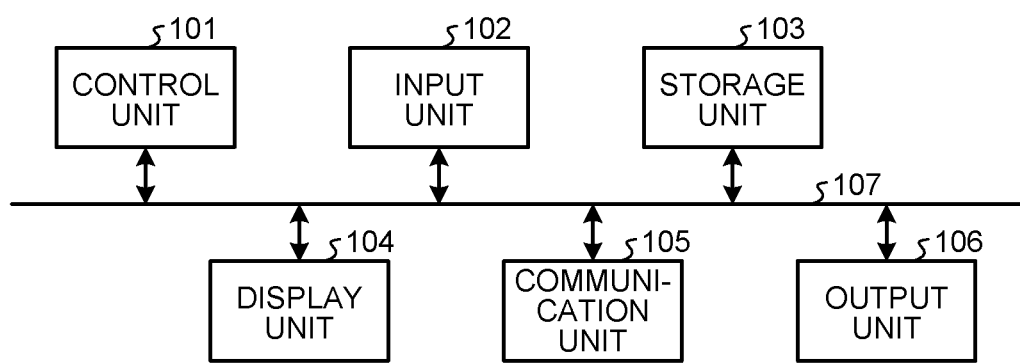
FIG. 19 is a diagram illustrating an exemplary configuration of a computer system that implements the central device according to the second embodiment.

Next, a hardware configuration of the central device 10 according to the present embodiment will be described. FIG. 19 is a diagram illustrating an exemplary configuration of a computer system that implements the central device 10 according to the present embodiment.

As illustrated in FIG. 19, this computer system includes a control unit 101, an input unit 102, a storage unit 103, a display unit 104, a communication unit 105, and an output unit 106, which are connected to one another via a system bus 107. In FIG. 19, the control unit 101 is, for example, a CPU or the like, and executes a program describing the processes in the central device 10 according to the present embodiment. The input unit 102 includes, for example, a keyboard, a mouse, and the like, and is used by the user of the computer system to input various types of information. The storage unit 103 includes various types of memories such as a RAM and a ROM and a storage device such as a hard disk, and stores, for example, programs to be executed by the control unit 101 and necessary data obtained during processing. The storage unit 103 is also used as a temporary storage area for programs. The display unit 104 includes a liquid crystal display (LCD) panel or the like, and displays various screens to the user of the computer system. The communication unit 105 is a receiver and a transmitter that perform communication processing. The output unit 106 is a printer or the like.

An example of the operation of the computer system that is performed until the load control program for implementing the central device 10 according to the present embodiment becomes executable will be described. In the computer system having the above-mentioned configuration, for example, the load control program is installed on the storage unit 103 from a compact disc (CD)-ROM or digital versatile disc (DVD)-ROM set in a CD-ROM drive or DVD-ROM drive (not illustrated). Then, when the load control program is executed, the program read from the storage unit 103 is stored in the storage unit 103. In this state, the control unit 101 executes the processes as the central device 10 according to the present embodiment in accordance with the load control program stored in the storage unit 103.

In the above description, the load control program describing the processes is provided using a CD-ROM or DVD-ROM as a recording medium. Alternatively, the program may be provided by a transmission medium such as the Internet via the communication unit 105 according to the configuration of the computer system, the capacity of the program, and the like.

The communication unit 12 illustrated in FIG. 13 is implemented by, for example, the communication unit 105 illustrated in FIG. 19. The parameter determination unit 11 illustrated in FIG. 13 is implemented by the control unit 101 executing the load control program. The storage unit 103 is also used to implement the function of the parameter determination unit 11. The consumer information storage unit 13, the grid facility information storage unit 14, and the storage battery information storage unit 15 illustrated in FIG. 13 are implemented by the storage unit 103 illustrated in FIG. 19. Note that FIG. 19 is an example, and the configuration of the computer system is not limited to the example illustrated in FIG. 19. For example, the output unit 106 may not be provided in the computer system.

In addition, the central device 10 according to the present embodiment may be implemented by one computer system or may be implemented by a plurality of computer systems. For example, the central device 10 may be implemented by a cloud system or may be implemented by a public cloud system.

The hardware configuration of the load control device 5a according to the present embodiment is obtained by adding a communication unit including a transmitter and a receiver to the voltage measuring instrument and the control circuit described in the first embodiment.

The load control program according to the present embodiment causes, for example, the central device 10 to execute: a step of determining, for each load 6, whether to place a load limitation on the load 6, and generating limitation information indicating a determination result as to whether to place a load limitation on the load 6; and a step of transmitting, for each load 6, the limitation information to the load control device 5a that controls the load 6.

As described above, in the present embodiment, the central device 10 updates the load control information of the load control device 5a by transmitting the load control information to the load control device 5a in normal times. As a result, effects similar to those of the first embodiment can be obtained, and more appropriate load control can be performed than in the first embodiment because load control is performed based on newer information.

Modification 1

Figure 20:
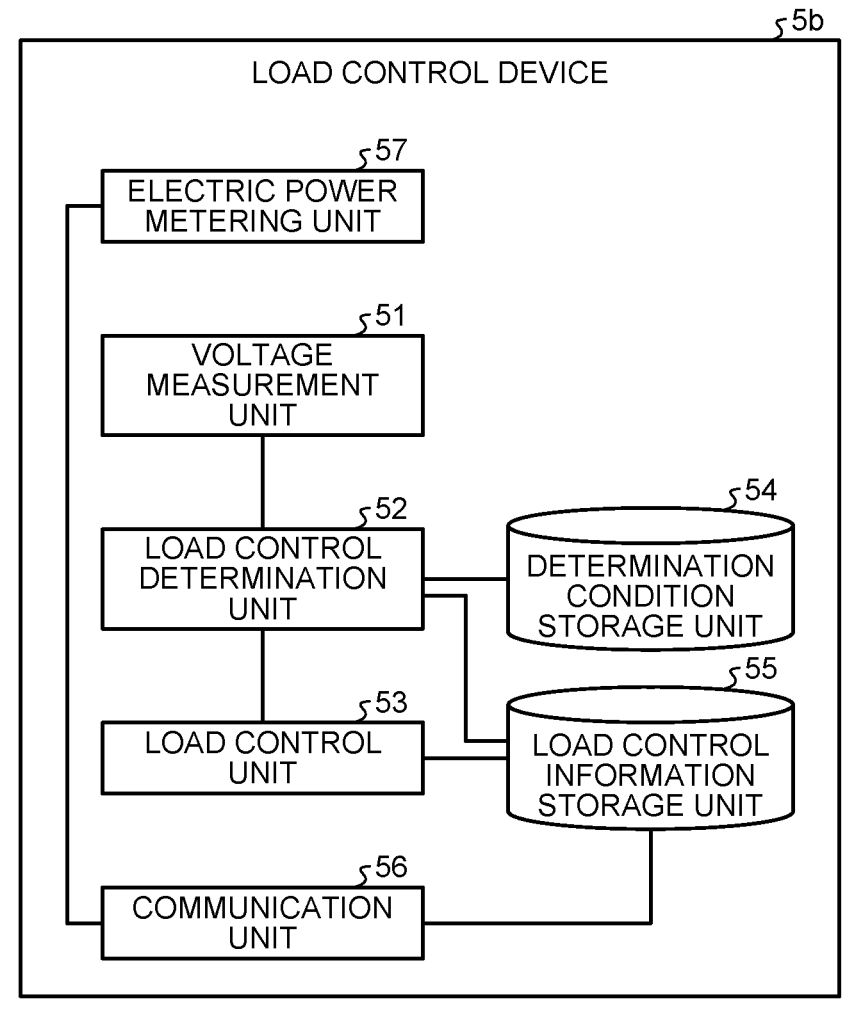
FIG. 20 is a diagram illustrating an exemplary configuration of the load control device according to Modification 1 of the second embodiment.

Next, Modification 1 of the present embodiment will be described. FIG. 20 is a diagram illustrating an exemplary configuration of the load control device according to Modification 1 of the present embodiment. As illustrated in FIG. 20, the load control device 5b according to Modification 1 is similar to the load control device 5a except that an electric power metering unit 57 is added to the load control device 5a.

Figures 21, 22:
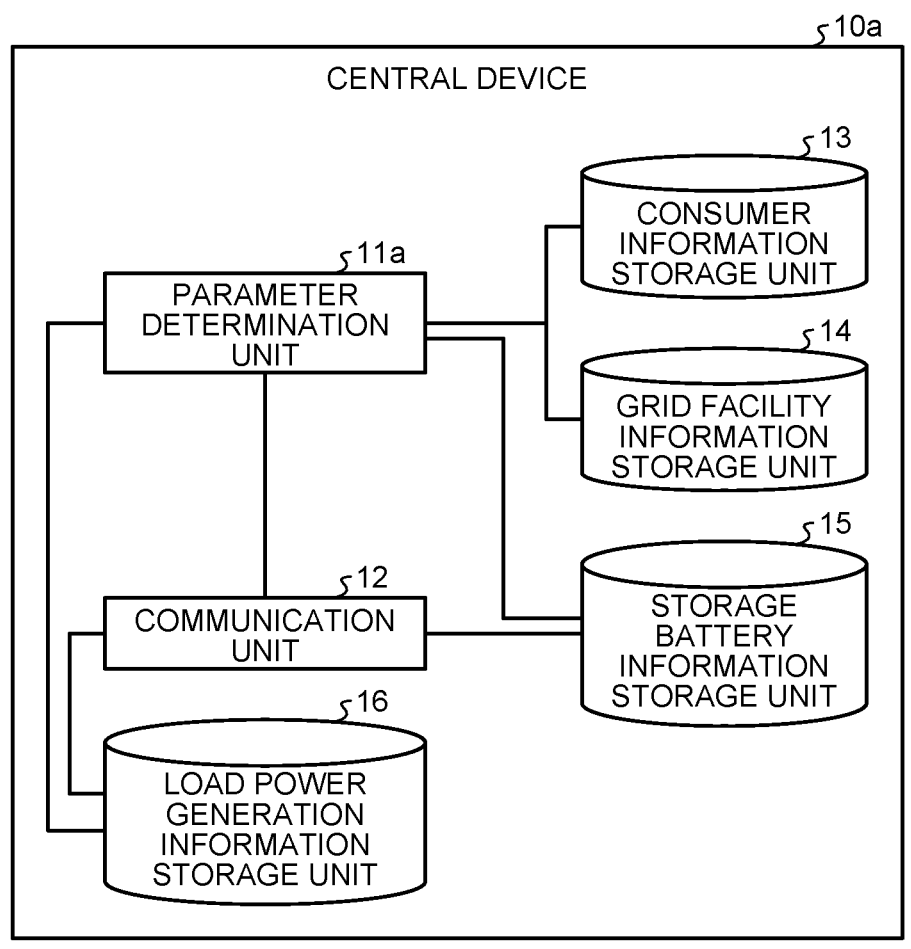
FIG. 21 is a diagram illustrating an exemplary configuration of the central device according to Modification 1 of the second embodiment.
FIG. 22 is a diagram illustrating an example of startup information according to Modification 2 of the second embodiment.

FIG. 21 is a diagram illustrating an exemplary configuration of the central device according to Modification 1 of the present embodiment. The central device 10a is similar to the central device 10 except that a parameter determination unit 11a is provided instead of the parameter determination unit 11 and a load power generation information storage unit 16 is added. The microgrid and the load control system in Modification 1 are similar to the microgrid 9a and the load control system illustrated in FIGS. 9 and 10 except that the load control device 5b is used instead of the load control device 5a and the central device 10a is used instead of the central device 10.

The electric power metering unit 57 of the load control device 5b meters the electric power consumed by the load 6, and outputs the metering result to the communication unit 56. The electric power metering unit 57 may further meter the electric power generated by the power generation facility in the microgrid, and output the metering result to the communication unit 56. The communication unit 56 transmits the metering result to the central device 10a.

The central device 10a stores load power generation information, i.e., the metering result received from the load control device 5b in the load power generation information storage unit 16. The parameter determination unit 11a calculates the power consumption of each load 6 on the basis of the metering result of each load 6 stored in the load power generation information storage unit 16. When calculating load control information, the parameter determination unit 11a determines the load control information, using the power consumption calculated on the basis of the metering result instead of the power consumption stored in the grid facility information.

Modification 2

Next, Modification 2 of the present embodiment will be described. The configurations of the central device 10 and the storage battery control device 81a in Modification 2 are similar to those of the example illustrated in FIGS. 12 and 13, and the load control device 5 in Modification 2 is similar to that of the example illustrated in FIG. 5.

How much load limitation needs to be placed at a black start, that is, the degree of load limitation, depends on the SoC of the storage battery 82 of the power storage system Ba indicated by the SoC information and the value of a certain period in which only the power storage system 8a is used as a power source at the black start. For example, therefore, the parameter determination unit 11 determines in advance and holds the correspondence between the degree of load limitation and a value obtained by multiplying the SoC of the storage battery 82 by a certain period. The parameter determination unit 11 then determines the degree of load limitation, using that correspondence, the SoC information acquired from the power storage system 8a, and a certain time. Note that a certain period may be fixed, in which case the correspondence between the SoC of the storage battery 82 and the degree of load limitation may be determined in advance and held by the parameter determination unit 11, and the parameter determination unit 11 may determine the degree of load limitation, using the correspondence and the SoC information acquired from the power storage system 8a. For example, a plurality of classes such as $C_1$, $C_2$, and $C_3$ are defined as the degree of load limitation, and class information indicating the priority of the load 6 of the consumer 4a to be stopped is determined for each class.

After determining the above correspondence, the SoC information acquired from the power storage system 8a, the certain time, and the degree of load limitation, the parameter determination unit 11 can determine the consumer 4a to stop the load 6, by using the class information and the consumer information exemplified in FIG. 14. In Modification 2, a plurality of determination conditions are stored in advance in the load control device 5 without using the load control information, and the way of starting the power storage system 8a is changed according to the degree of load limitation. As a result, the state of change in the measured voltage measured by the load control device 5 is changed according to the degree of load limitation, which enables the load control device 5 to grasp the degree of load limitation according to which determination condition the measured voltage meets.

In Modification 2, the degree of load limitation is determined by the central device 10 as described above. For example, the correspondence between the degree of load limitation, the priority of the load 6 to be operated, and the startup parameter of the power storage system 8a is stored as startup information in advance in the storage battery information storage unit 15. The priority of the load 6 to be operated indicates the priority of the consumer 4a the load 6 of which is operated at the corresponding degree of load limitation. Note that the power storage system &a can perform startup by designating a selected set of parameters among a plurality of seta of startup parameters. In addition, not only the case of determining whether to stop the load 6 but also the case of setting an upper limit value may be included. In this case, the upper limit value of the load 6 is also determined in advance according to the degree of load limitation.

FIG. 22 is a diagram illustrating an example of startup information according to Modification 2 of the present embodiment. As illustrated in FIG. 22, the startup information is, for example, information in which the degree of load limitation and the startup parameter of the power storage system 8a are associated with each other. In the example illustrated in FIG. 22, the highest degree of load limitation is $C_1$, the second highest degree of load limitation is $C_2$, and the third highest degree of load limitation is $C_3$. In the example illustrated in FIG. 22, when the degree of load limitation is $C_1$, the priority of the load 6 to be operated is $L_1$, which means that every load 6 is stopped except that in the consumer 4a with the priority $L_1$. Note that priority $L_3$ is the highest (highest priority) and priority $L_2$ is the second highest. Although not illustrated in FIG. 22, the consumer 4a with the priority of $L_3$ is also defined. Priority $L_3$ is lower than priority $L_2$. In the example illustrated in FIG. 22, when the degree of load limitation is $C_2$, the priorities of the loads 6 to be operated are $L_1$ and $L_2$ (with upper limit), which means that every load 6 is stopped except those in the consumers 4a with the priorities $L_1$ and $L_2$, and the load 6 of the consumer 4a with the priority $L_2$ is given an upper limit value. The upper limit value is determined in advance. In the example illustrated in FIG. 22, when the degree of load limitation is $C_3$, the priorities of the loads 6 to be operated are $L_1$ and $L_2$ (with no upper limit), which means that every load 6 is stopped except those in the consumers 4a with the priorities $L_1$ and $L_2$, and the load 6 of the consumer da with the priority $L_2$ is not given an upper limit value.

As illustrated in FIG. 22, the startup parameter of the power storage system 8a is determined corresponding to the degree of load limitation, and the parameter determination unit 11 calculates the startup parameter of the power storage system 8a every time the SoC information is received. In FIG. 22, a set of startup parameters consists of two parameters, but the number of startup parameters per set is not limited to two. Instead of one set of startup parameters, one parameter may be determined according to the degree of load limitation. The startup parameter is, for example, a value indicating how many seconds it takes for the gradually increasing applied voltage to reach the rated voltage, which is a non-limiting example.

At a black start, for example, a worker etc. starts the power storage system 8a, using the latest startup parameter determined by parameter determination unit 11. Alternatively, the central device 10 may be able to start the power storage system 8a through communication, in which case the central device 10 may transmit the latest startup parameter to the power storage system 8a to designate the startup parameter.

As described above, in Modification 2, for example, the central device 10 uses the SoC information to determine the degree of load limitation indicating to what extent the load is limited, and uses the correspondence between the degree of load limitation and a startup parameter to determine the startup parameter corresponding to the determined degree of load limitation, the startup parameter determining a change in applied voltage at startup of the power storage system 8a.

In Modification 2, the determination condition storage unit 54 of the load control device 5 holds a plurality of determination conditions corresponding to the degree of load limitation, and the load control information storage unit 55 holds the load control information, i.e., the content of the load limitation corresponding to each determination condition. The plurality of determination conditions are set in advance such that the startup parameter corresponding to the degree of load limitation can be identified. For example, the load control device 5 corresponding to the consumer 4a with the priority $L_2$ includes the load control information including the control content corresponding to the determination condition with the degree of load limitation $C_1$, the control content corresponding to the determination condition with the degree of load limitation $C_2$, and the control content corresponding to the determination condition with the degree of load limitation $C_3$. The control content corresponding to the determination condition with the degree of load limitation $C_1$ is information indicating that the load 6 is stopped. The control content corresponding to the determination condition with the degree of load limitation $C_2$ is information indicating that the load 6 is limited to a predetermined upper limit value or less. The control content corresponding to the determination condition with the degree of load limitation $C_3$ is information indicating that the load 6 is not limited.

An example of a plurality of determination conditions corresponding to the degree of load limitation will be described. For example, assume that, the startup parameter is the number of seconds required to reach the rated voltage; the startup parameter is one second when the degree of load limitation is $C_1$; the startup parameter is two seconds when the degree of load limitation is $C_2$; and the applied voltage (peak-to-peak, or effective value) in the power storage system 8a increases substantially linearly. In this case, the change in applied voltage per period is larger when the startup parameter is one second than when the startup parameter is two seconds, Instead of the condition that $Y_2$-$Y_1$ is equal to or greater than the threshold described in the first embodiment, therefore, a condition that $Y_2$-$Y_1$ is equal to or greater than a first threshold can be used as the determination condition corresponding to the degree of load limitation $C_1$, and a condition that $Y_2$-$Y_1$ is equal to or greater than a second threshold and less than the first threshold can be used as the determination condition corresponding to the degree of load limitation $C_2$. The second threshold is smaller than the first threshold. The first threshold and the second threshold are determined such that the case where the degree of load limitation is $C_1$ and the case where the degree of load limitation is $C_2$ can be discriminated from each other according to the state of change in applied voltage when each startup parameter is set.

Also in Modification 2, as illustrated in FIG. 11, the load control device 5a including the communication unit 56 may be used, and the central device 10 may update the load control information, the determination condition, and the like by transmitting the load control information, the determination condition, and the like to the load control device 5a in normal times.

Also in Modification 2, using the measured voltage, the held determination condition, and the load control information without requiring communication at a black start, the load control device 5 can perform load control when the load control device 5 is identified as a load control target.

The configurations described in the above-mentioned embodiments indicate examples. The embodiments can be combined with another well-known technique and with each other, and some of the configurations can be omitted or changed in a range not departing from the gist.

REFERENCE SIGNS LIST 1 distribution substation; 2-1, 2-2 switch; 3 transformer; 4-1 to 4-5, 4a-1 to 4a-5 consumer, 5, 5a, 5b load control device; 6 load; 7 PV; 8, 8a power storage system; 9, 9a microgrid; 10, 10a central device; 11, 11a parameter determination unit; 12, 56, 83 communication unit; 13 consumer information storage unit; 14 grid facility information storage unit; 15 storage battery information storage unit; 16 load power generation information storage unit; 21, 22 communication network, 51 voltage measurement unit; 52 load control determination unit; 53 load control unit; 54 determination condition storage unit; 55 load control information storage unit; 57 electric power metering unit; 81, 81a storage battery control device; 82 storage battery; 84 state monitoring unit.

The invention claimed is:

1. A load control device to control a load belonging to a small-scale electrical grid capable of autonomous operation using a power storage system during a power outage in an electrical grid, the load control device comprising:

a voltage measuring instrument to measure a voltage at a power reception point of a consumer corresponding to the load;

a limitation information storage circuit to store limitation information indicating whether to place a load limitation on the load during the autonomous operation;

a load control determination circuit to determine whether the autonomous operation has started after occurrence of a power outage in the electrical grid, by using the limitation information stored in the limitation information storage circuit and a measurement value measured by the voltage measuring instrument;

a load control circuit to place a load limitation on the load in response to the load control determination circuit determining that the autonomous operation has started; and a determination condition storage circuit to store a determination condition related to the voltage at the power reception point of the consumer for determining whether the autonomous operation has started, wherein the determination condition is determined on a basis of a change in applied voltage at startup of the power storage system, the limitation information is load control information indicating whether to place a load limitation on the load during the autonomous operation, the load control determination circuit determines whether the autonomous operation has started, by determining whether the measurement value measured by the voltage measuring instrument satisfies the determination condition stored in the determination condition storage circuit when the load control information indicates that the load limitation on the load is to be placed, and the determination condition is a condition that a time during which a value indicating amplitude of the measurement value is equal to or greater than a certain value and less than a predetermined value is continued for a predetermined time or more.

2. A load control device to control a load belonging to a small-scale electrical grid capable of autonomous operation using a power storage system during a power outage in an electrical grid, the load control device comprising:

a voltage measuring instrument to measure a voltage at a power reception point of a consumer corresponding to the load;

a limitation information storage circuit to store limitation information indicating whether to place a load limitation on the load during the autonomous operation;

a load control determination circuit to determine whether the autonomous operation has started after occurrence of a power outage in the electrical grid, by using the limitation information stored in the limitation information storage circuit and a measurement value measured by the voltage measuring instrument;

a load control circuit to place a load limitation on the load in response to the load control determination circuit determining that the autonomous operation has started; and a determination condition storage circuit to store a determination condition related to the voltage at the power reception point of the consumer for determining whether the autonomous operation has started, wherein the determination condition is determined on a basis of a change in applied voltage at startup of the power storage system, the limitation information is load control information indicating whether to place a load limitation on the load during the autonomous operation, the load control determination circuit determines whether the autonomous operation has started, by determining whether the measurement value measured by the voltage measuring instrument satisfies the determination condition stored in the determination condition storage circuit when the load control information indicates that the load limitation on the load is to be placed, and the determination condition is a condition that a value obtained by subtracting a second value from a first value is equal to or greater than a threshold, the first value indicating amplitude of the measurement value, the second value indicating amplitude in a period immediately preceding a period from which the first value is calculated.

3. The load control device according to claim 2, comprising a transmitter/receiver to receive the load control information from a central device, and update the load control information stored in the limitation information storage circuit, with the load control information received, wherein the load control determination circuit determines whether to place a load limitation on the load, by using the load control information updated when there is no power outage in the electrical grid.

4. The load control device according to claim 1, comprising a transmitter/receiver to receive the load control information from a central device, and update the load control information stored in the limitation information storage circuit, with the load control information received, wherein the load control determination circuit determines whether to place a load limitation on the load, by using the load control information updated when there is no power outage in the electrical grid.

5. A central device to manage a small-scale electrical grid capable of autonomous operation using a power storage system during a power outage in an electrical grid, the central device comprising:

a processor;

a memory to store a program that when executed by the processor performs a parameter determination process of determining, for each of loads belonging to the small-scale electrical grid, whether to place a load limitation on the load, and generating limitation information indicating a determination result as to whether to place a load limitation on the load; and a transmitter/receiver to transmit, for each of the loads, the limitation information to a load control device that controls the load, wherein the load control device measures a voltage at a power reception point of a consumer corresponding to the load to be controlled, receives and stores the limitation information, updates the stored limitation information, with the limitation information newly received upon newly receiving the limitation information, determines whether the autonomous operation has started after occurrence of a power outage in the electrical grid, by using the stored limitation information and a measurement value of the voltage, and places a load limitation in response to determining that the autonomous operation has started.

6. The central device according to claim 5, wherein the parameter determination process determines, for each of the loads, whether to place a load limitation on the load, on a basis of priority of the consumer corresponding to the load.

7. The central device according to claim 6, wherein the transmitter/receiver acquires, from the power storage system, an index indicating a state of charge of a storage battery of the power storage system, and the parameter determination process determines, for each of the loads, whether to place a load limitation on the load, by using the priority of the consumer corresponding to the load and the index.

8. A load control system comprising:

a plurality of load control devices to control a plurality of loads belonging to a small-scale electrical grid capable of autonomous operation using a power storage system during a power outage in an electrical grid; and a central device to manage the small-scale electrical grid, wherein the central device includes:

a processor;

a memory to store a program that when executed by the processor performs a parameter determination process of determining, for each of the loads, whether to place a load limitation on the load, and generating limitation information indicating a determination result as to whether to place a load limitation on the load; and a transmitter/receiver to transmit, for each of the loads, the limitation information to a corresponding one of the load control devices that controls the load, and each of the load control devices includes:

a limitation information storage circuit to store the limitation information;

a transmitter/receiver to receive the limitation information, store the limitation information in the limitation information storage circuit, and update the limitation information, stored in the limitation information storage circuit, with the limitation information newly received upon newly receiving the limitation information;

a voltage measuring instrument to measure a voltage at a power reception point of a consumer corresponding to the load;

a load control determination circuit to determine whether the autonomous operation has started after occurrence of a power outage in the electrical grid, by using the limitation information stored in the limitation information storage circuit and a measurement value measured by the voltage measuring instrument; and a load control circuit to place a load limitation on the load in response to the load control determination circuit determining that the autonomous operation has started.

9. The load control system according to claim 8, comprising the power storage system, wherein the central device acquires, from the power storage system, an index indicating a state of charge of a storage battery of the power storage system, and determines, for each of the loads, whether to place a load limitation on the load, by using the index and priority of the consumer corresponding to the load.

10. The load control system according to claim 9, wherein the central device uses the index to determine a degree of load limitation indicating to what extent the load is limited, and uses a correspondence between the degree of load limitation and a startup parameter to determine the startup parameter corresponding to the determined degree of load limitation, the startup parameter determining a change in applied voltage at startup of the power storage system.

11. A load control method for a load control device to control a load belonging to a small-scale electrical grid capable of autonomous operation using a power storage system during a power outage in an electrical grid, the load control method comprising:

measuring a voltage at a power reception point of a consumer corresponding to the load;

storing limitation information indicating whether to place a load limitation on the load during the autonomous operation;

performing a determination process of determining whether the autonomous operation has started after occurrence of a power outage in the electrical grid, by using the limitation information stored and a measurement value measured;

placing a load limitation on the load in response to determining that the autonomous operation has started; and storing a determination condition related to the voltage at the power reception point of the consumer for determining whether the autonomous operation has started, wherein the determination condition is determined on a basis of a change in applied voltage at startup of the power storage system, the limitation information is load control information indicating whether to place a load limitation on the load during the autonomous operation, the determination process includes determining whether the autonomous operation has started, by determining whether the measurement value measured satisfies the determination condition stored when the load control information indicates that the load limitation on the load is to be placed, and the determination condition is a condition that a time during which a value indicating amplitude of the measurement value is equal to or greater than a certain value and less than a predetermined value is continued for a predetermined time or more.

12. A load control method for a central device to manage a small-scale electrical grid capable of autonomous operation using a power storage system during a power outage in an electrical grid, the load control method comprising:

determining, for each of loads belonging to the small-scale electrical grid, whether to place a load limitation on the load, and generating limitation information indicating a determination result as to whether to place a load limitation on the load; and transmitting, for each of the loads, the limitation information to a load control device that controls the load, wherein the load control device measures a voltage at a power reception point of a consumer corresponding to the load to be controlled, receives and stores the limitation information, updates the stored limitation information with the limitation information newly received upon newly receiving the limitation information, determines whether the autonomous operation has started after occurrence of a power outage in the electrical grid, by using the stored limitation information and a measurement value of the voltage, and places a load limitation in response to determining that the autonomous operation has started.

13. A non-transitory storage medium to store a load control program for a load control device to control a load belonging to a small-scale electrical grid capable of autonomous operation using a power storage system during a power outage in an electrical grid, the load control device including a voltage measuring instrument to measure a voltage at a power reception point of a consumer corresponding to the load, the load control program causing the load control device to execute:

acquiring a measurement value measured by the voltage measuring instrument;

storing limitation information indicating whether to place a load limitation on the load during the autonomous operation;

performing a determination process of determining whether the autonomous operation has started after occurrence of a power outage in the electrical grid, by using the stored limitation information and the measurement value measured by the voltage measuring instrument;

placing a load limitation on the load in response to determining that the autonomous operation has been started; and storing a determination condition related to the voltage at the power reception point of the consumer for determining whether the autonomous operation has started, wherein the determination condition is determined on a basis of a change in applied voltage at startup of the power storage system, the limitation information is load control information indicating whether to place a load limitation on the load during the autonomous operation, the determination process includes determining whether the autonomous operation has started, by determining whether the measurement value measured satisfies the determination condition stored when the load control information indicates that the load limitation on the load is to be placed, and the determination condition is a condition that a time during which a value indicating amplitude of the measurement value is equal to or greater than a certain value and less than a predetermined value is continued for a predetermined time or more.

14. A non-transitory storage medium to store a load control program for a central device to manage a small-scale electrical grid capable of autonomous operation using a power storage system during a power outage in an electrical grid, the load control program causing the central device to execute:

determining, for each of loads belonging to the small-scale electrical grid, whether to place a load limitation on the load, and generating limitation information indicating a determination result as to whether to place a load limitation on the load; and transmitting, for each of the loads, the limitation information to a load control device that controls the load, wherein the load control device measures a voltage at a power reception point of a consumer corresponding to the load to be controlled, receives and stores the limitation information, updates the stored limitation information with the limitation information newly received upon newly receiving the limitation information, determines whether the autonomous operation has started after occurrence of a power outage in the electrical grid, by using the limitation information stored and a measurement value of the voltage, and places a load limitation in response to determining that the autonomous operation has started.

15. A load control method for a load control device to control a load belonging to a small-scale electrical grid capable of autonomous operation using a power storage system during a power outage in an electrical grid, the load control method comprising:

measuring a voltage at a power reception point of a consumer corresponding to the load;

storing limitation information indicating whether to place a load limitation on the load during the autonomous operation;

performing a determination process of determining whether the autonomous operation has started after occurrence of a power outage in the electrical grid, by using the limitation information stored and a measurement value measured;

placing a load limitation on the load in response to determining that the autonomous operation has started; and storing a determination condition related to the voltage at the power reception point of the consumer for determining whether the autonomous operation has started, wherein the determination condition is determined on a basis of a change in applied voltage at startup of the power storage system, the limitation information is load control information indicating whether to place a load limitation on the load during the autonomous operation, the determination process includes determining whether the autonomous operation has started, by determining whether the measurement value measured satisfies the determination condition stored when the load control information indicates that the load limitation on the load is to be placed, and the determination condition is a condition that a value obtained by subtracting a second value from a first value is equal to or greater than a threshold, the first value indicating amplitude of the measurement value, the second value indicating amplitude in a period immediately preceding a period from which the first value is calculated.

16. A non-transitory storage medium to store a load control program for a load control device to control a load belonging to a small-scale electrical grid capable of autonomous operation using a power storage system during a power outage in an electrical grid, the load control device including a voltage measuring instrument to measure a voltage at a power reception point of a consumer corresponding to the load, the load control program causing the load control device to execute:

acquiring a measurement value measured by the voltage measuring instrument;

storing limitation information indicating whether to place a load limitation on the load during the autonomous operation;

performing a determination process of determining whether the autonomous operation has started after occurrence of a power outage in the electrical grid, by using the stored limitation information and the measurement value measured by the voltage measuring instrument;

placing a load limitation on the load in response to determining that the autonomous operation has been started; and storing a determination condition related to the voltage at the power reception point of the consumer for determining whether the autonomous operation has started, wherein the determination condition is determined on a basis of a change in applied voltage at startup of the power storage system, the limitation information is load control information indicating whether to place a load limitation on the load during the autonomous operation, the determination process includes determining whether the autonomous operation has started, by determining whether the measurement value measured satisfies the determination condition stored when the load control information indicates that the load limitation on the load is to be placed, and the determination condition is a condition that a value obtained by subtracting a second value from a first value is equal to or greater than a threshold, the first value indicating amplitude of the measurement value, the second value indicating amplitude in a period immediately preceding a period from which the first value is calculated.

* * * * *